(12) United States Patent
Zhang et al.

(10) Patent No.: US 11,847,829 B2
(45) Date of Patent: Dec. 19, 2023

(54) METHOD, APPARATUS, ELECTRONIC DEVICE, AND COMPUTER STORAGE MEDIUM FOR VIDEO PROCESSING

(71) Applicant: ALIBABA GROUP HOLDING LIMITED, Grand Cayman (KY)

(72) Inventors: Shiwei Zhang, Hangzhou (CN); Zhurong Xia, Hangzhou (CN); Zhiyuan Geng, Hangzhou (CN); Mingqian Tang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 17/173,534

(22) Filed: Feb. 11, 2021

(65) Prior Publication Data

US 2021/0295056 A1    Sep. 23, 2021

(30) Foreign Application Priority Data

Mar. 23, 2020 (CN) .......................... 202010208198.8

(51) Int. Cl.
*G06V 20/00* (2022.01)
*G06V 20/40* (2022.01)
*G06V 10/75* (2022.01)

(52) U.S. Cl.
CPC .............. *G06V 20/49* (2022.01); *G06V 10/75* (2022.01); *G06V 20/41* (2022.01); *G06V 20/46* (2022.01)

(58) Field of Classification Search
CPC .......... G06K 9/00765; G06K 9/00718; G06K 9/00744; G06K 9/4609

USPC ....................................................... 386/241
See application file for complete search history.

(56) References Cited

U.S. PATENT DOCUMENTS

| | | | |
|---|---|---|---|
| 5,831,616 A | 11/1998 | Lee | |
| 6,034,679 A | 3/2000 | McGrath | |
| 6,195,458 B1 | 2/2001 | Warnick et al. | |
| 6,256,451 B1 | 7/2001 | Mitsui | |
| 6,393,054 B1 | 5/2002 | Altunbasak et al. | |
| 6,516,090 B1 | 2/2003 | Lennon et al. | |
| 6,744,922 B1 | 6/2004 | Walker | |
| 7,362,946 B1 | 4/2008 | Kowald | |
| 8,886,011 B2 | 11/2014 | Chou et al. | |
| 8,958,645 B2 | 2/2015 | Lu et al. | |
| 9,317,751 B2 | 4/2016 | Li et al. | |
| 9,465,435 B1 | 10/2016 | Zhang et al. | |
| 10,867,183 B2 | 12/2020 | Shetty et al. | |
| 2003/0091235 A1* | 5/2003 | Xiong | G06F 16/785 382/199 |

(Continued)

*Primary Examiner* — Daniel T Tekle
(74) *Attorney, Agent, or Firm* — James J. DeCarlo; Greenberg Traurig, LLP

(57) ABSTRACT

Provided in embodiments of the disclosure are a method and apparatus for video processing, an electronic device, and a computer storage medium. In one embodiment, a method for video processing includes: identifying, by a processor, video segments from a video, each video segment associated with a shot of the video; computing, by the processor, degrees of similarity among the video segments, the degrees of similarity associated with corresponding segmentation levels; and segmenting, by the processor, the video segments based on the degrees of similarity and the segmentation levels to generate sets of scene-based video segments, each set of scene-based video segment associated with a corresponding segmentation level.

20 Claims, 12 Drawing Sheets

(56) References Cited

U.S. PATENT DOCUMENTS

| | | | |
|---|---|---|---|
| 2010/0082585 A1 | 4/2010 | Barsook et al. | |
| 2010/0150408 A1* | 6/2010 | Ishikawa | H04N 5/147 |
| | | | 382/118 |
| 2010/0183225 A1* | 7/2010 | Vantaram | G06T 7/11 |
| | | | 382/173 |
| 2013/0259390 A1* | 10/2013 | Dunlop | G06V 10/42 |
| | | | 382/224 |
| 2016/0070962 A1* | 3/2016 | Shetty | G06V 20/70 |
| | | | 382/225 |

* cited by examiner

METHOD, APPARATUS, ELECTRONIC DEVICE, AND COMPUTER STORAGE MEDIUM FOR VIDEO PROCESSING

CROSS-REFERENCE TO RELATED APPLICATIONS

The present application claims priority to Chinese Patent Application No. 202010208198.8 filed on Mar. 23, 2020, which is incorporated herein by reference in its entirety.

BACKGROUND

Technical Field

Embodiments of the disclosure relate to the technical field of computer technologies, and in particular, to methods, apparatuses, electronic devices, and computer storage media for video processing.

Technical Field

In processing videos based on various requirements, video segmentation is a processing technique to perform secondary processing on a video, based on requirements of an Internet video and/or new media short video content platform, to segment an originally complete video into multiple segments based on certain logic or specific requests.

Presently, video segmentation typically includes shot-based segmentation and scene-based segmentation. However, in scene-based segmentation, oftentimes, it is difficult to clearly define a scene. Therefore, existing video segmentation techniques are generally performed based on shots. When a scene-based segmentation is needed, manual operations are further performed, leading to low efficiency and high labor costs.

SUMMARY

Embodiments of the disclosure provide solutions for video processing to solve at least part of the aforementioned problems.

In one embodiment, the disclosure provides a method for video processing, the method comprising: acquiring a plurality of units of shot-based video segments from a video to be segmented; and segmenting, based on a plurality of pre-configured segmentation levels and the degrees of similarity associated with the units of shot-based video segments corresponding to each of the segmentation levels, the video into scene-based video segments of different granularities corresponding to the plurality of segmentation levels, respectively.

In one embodiment, the disclosure provides a method for video processing, the method comprising: receiving a segmentation request sent by a client to segment a video, wherein the segmentation request comprises the information about a to-be-attained segmentation level; performing a scene boundary detection on the video at a segmentation level indicated by the information about the to-be-attained segmentation level to obtain scene-based video segments corresponding to the segmentation level; and returning the obtained scene-based video segments to the client.

In one embodiment, the disclosure provides a method for video processing, the method comprising: receiving, via an interactive interface, segmentation information input by a user, wherein the segmentation information comprises the information about a video to be segmented, and the information about a to-be-attained segmentation level for the video; generating a segmentation request based on the segmentation information; sending the segmentation request to a server; and receiving, from the server, scene-based video segments of the video based on the segmentation request, the scene-based video segments corresponding to the to-be-attained segmentation level.

In one embodiment, the disclosure provides an apparatus for video processing, the apparatus comprising: a first acquisition module configured to acquire a plurality of units of shot-based video segments from a video to be segmented; and a processing module configured to segment, based on a plurality of pre-configured segmentation levels and the degrees of similarity associated with the units of shot-based video segments corresponding to each of the segmentation levels, the video into scene-based video segments of different granularities corresponding to the plurality of segmentation levels, respectively.

In one embodiment, the disclosure provides an apparatus for video processing, the apparatus comprising: a first receiving module configured to receive a segmentation request sent by a client for a video to be segmented, wherein the segmentation request comprises the information about a to-be-attained segmentation level; a second acquisition module configured to perform a scene boundary detection on the video at a segmentation level indicated by the information about the to-be-attained segmentation level to obtain scene-based video segments corresponding to the segmentation level; and a returning module configured to return the obtained scene-based video segments to the client.

In one embodiment, the disclosure provides an apparatus for video processing, the apparatus comprising: a second receiving module configured to receive, via an interactive interface, segmentation information input by a user, wherein the segmentation information comprises the information about a video to be segmented, and the information about a to-be-attained segmentation level for the video; a generation module configured to generate a segmentation request based on the segmentation information for sending to a server; and a third receiving module configured to receive scene-based video segments of the video returned by the server based on the segmentation request, the scene-based video segments corresponding to the to-be-attained segmentation level.

In one embodiment, the disclosure provides an electronic device, the electronic device comprising: a processor and a memory, wherein the memory is configured to store at least one executable instruction, when executed by the processor, instructing the electronic device to perform the methods for video processing of the disclosure as described above.

In one embodiment, the disclosure provides a computer storage medium configured to store a computer program, when executed by a processor, performing the methods for video processing of the disclosure as described above.

With the solutions for video processing provided by embodiments of the disclosure, a unit of shot-based video segments is used as an elementary unit for processing. At one or more segmentation levels (e.g., representing segmentation granularities), the units of shot-based video segments are merged based on the degrees of similarity associated with the units of the shot-based video segments to form a plurality of scene-based video segments having the granularity matching that of each of the segmentation levels. This way, scene segmentation is performed at different granularities to meet the different requirements without manual operations, thereby greatly improving the efficiency of scene segmentation and reducing labor costs.

BRIEF DESCRIPTION OF THE DRAWINGS

The drawings used for the description of the embodiments are briefly described below. The drawings in the following description are some embodiments of the disclosure. Those of ordinary skill in the art can further obtain other accompanying drawings based on these accompanying drawings.

DETAILED DESCRIPTION OF EMBODIMENTS

The technical solutions in the embodiments of the disclosure are described clearly and completely below with reference to the accompanying drawings. The embodiments described herein are some, rather than all of the embodiments of the disclosure. All other embodiments acquired by a person of ordinary skill in the art based on the embodiments in the disclosure fall within the scope of the disclosure.

Figure 1A:
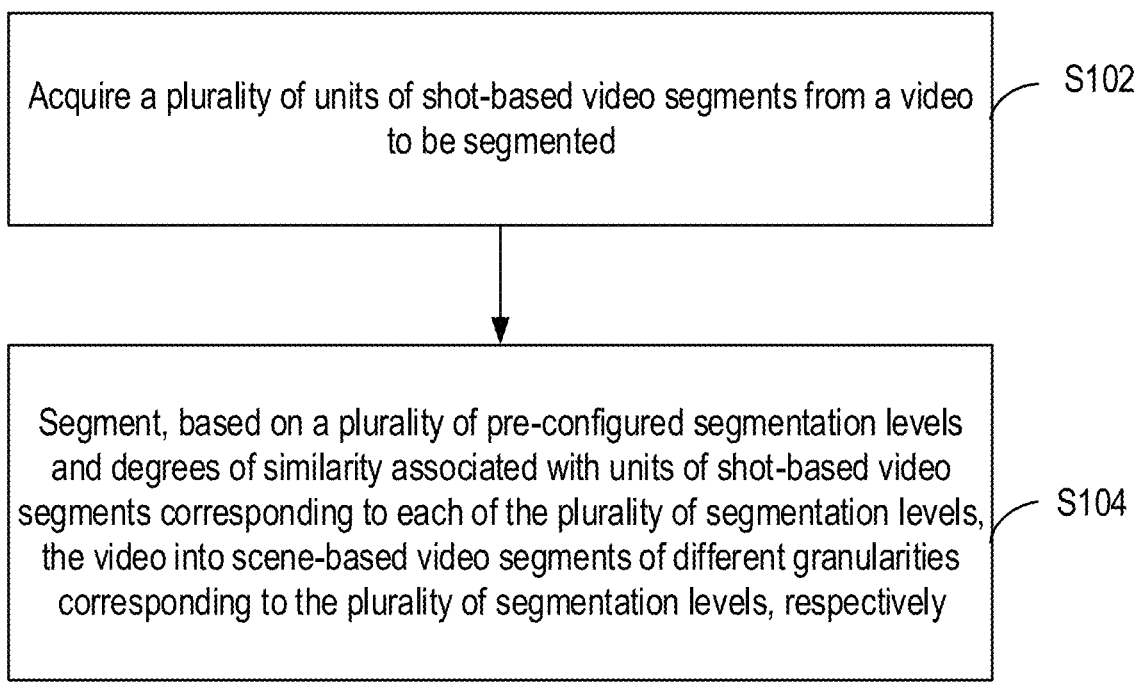
FIG. 1A is a flow diagram illustrating a method for video processing according to some embodiments of the disclosure.

FIG. 1A is a flow diagram illustrating a method for video processing according to some embodiments of the disclosure. In some embodiments, and as shown in FIG. 1A, the method for video processing the following steps.

Step S102: acquire a plurality of units of shot-based video segments from a video to be segmented.

In some embodiments, the video to be segmented includes any video, which can be a long video or a short video. In the field of video processing and as used herein, a shot refers to a group of frames between two editing points in video editing, constituting an elementary unit for an entire video. Accordingly, in some embodiments, a unit of video shot segments is adopted in the form of the aforementioned single shot. However, without limitation, in other embodiments, a plurality of single shots are combined into one unit of shot-based video segments, as required. That is, in various embodiments of the disclosure, a unit of shot-based video segments can be a single shot or can include a plurality of shots.

Step S104: segment, based on a plurality of pre-configured segmentation levels and degrees of similarity associated with units of shot-based video segments corresponding to each of the plurality of segmentation levels, the video into scene-based video segments of different granularities corresponding to the plurality of segmentation levels, respectively.

As used herein, a segmentation level indicates a number of levels based on which a video is to be segmented into different scene granularities, with different segmentation levels corresponding to scene granularities of different sizes. In some implementations, a segmentation level is configured based on actual requirements, without limitation.

In some embodiments, the degrees of similarity associated with the units of shot-based video segments corresponding to each of the segmentation levels are acquired in advance. For example, such degrees of similarity are calculated in advance, or acquired from a third-party interface or application, and so on. In one implementation, a plurality of units of shot-based video segments is initially acquired for a video. Afterward, for each of the segmentation levels and based on the degrees of similarity of the units of shot-based video segments, segmentation is performed based on the different degrees of similarity required at the different segmentation levels to generate scene-based video segments of different granularities. In another implementation, after the plurality of units of shot-based video segments is initially acquired for the video, for an initial segmentation level, a plurality of scene-based video segments of a granularity that corresponds to the initial segmentation level are obtained based on the degrees of similarity associated with the units of shot-based video segments. Then, the plurality of scene-based video segments corresponding to the initial segmentation level is designated as the units of shot-based video segments of the subsequent level. As such, video segmentation at the subsequent level is performed based on the degrees of similarity associated with the newly-designated units of shot-based video segments to generate a plurality of scene-based video segments of the granularity that corresponds to the subsequent level. Accordingly, a video is segmented to generate scene-based video segments of different granularities.

In some embodiments, the degrees of similarity associated with a plurality of units of shot-based video segments are determined by any suitable method. As a non-limiting example, such a method includes a cosine distance method. Taking three units A, B, and C of shot-based video segments as an example, the degrees of similarity associated with the three units include a degree of similarity between A and B, a degree of similarity between B and C, and a degree of similarity between A and C. In some embodiments, the degrees of similarity indicate, at least in part, whether different units of shot-based video segments possibly belong to the same scene.

In one implementation, step S104 includes: for a pre-configured plurality of segmentation levels, determining a plurality of units of shot-based video segments corresponding to each of the plurality of pre-configured segmentation levels, and the degrees of similarity associated with the units of shot-based video segments; merging, at each of the plurality of segmentation levels and based on temporal relationship(s) among the plurality of units of shot-based video segments, units of shot-based video segments having the degrees of similarity meeting a pre-configured similarity threshold that corresponds to each of the segmentation levels; and obtaining, based on a merging result, scene-based video segments corresponding to each of the segmentation levels.

As used herein, a temporal relationship among the plurality of units of shot-based video segments represents a precedence sequence of the plurality of units of shot-based video segments. Still using the above-described example of units A, B, and C, if in a routine playback unit A of shot-based video segments is played before unit B, and unit B is played before unit C, the temporal relationship among units A, B, and C is A→B→C.

Each segmentation level dictates a different scene granularity; thus, for each segmentation level, a corresponding degree of similarity threshold is pre-configured based on the scene granularity requirements at the respective level. The units of shot-based video segments having the degrees of similarity meeting the pre-configured similarity threshold are merged to obtain a merging result corresponding to each segmentation level, e.g., scene-based video segments of different granularities.

In various embodiments, the obtained scene-based video segments include logical segments and/or physical segments. For example, for a segmentation level of a video X, via the aforementioned processing, the units of shot-based video segments included in each of the three scene-based video segments corresponding to the particular level are recorded without physical segmentation. In this case, all the video data still exists in video X. This way, various requirements of different scenarios can be met. For example, in some scenarios, the information about the aforementioned logical segmentation is needed, and then the corresponding scene-based video segments are processed based on the information, with effective reduction in storage space. Alternatively, for a segmentation level of video X, not only three scene-based video segments at the segmentation level of video X are determined, but also the independent scene-based video segments X1, X2, and X3 are obtained via segmentation. In this case, the video data includes X1, X2, and X3, in addition to video X. This way, various requirements of different scenarios can be met. For example, a requirement of a scenario to obtain scene-based video segments directly is met this way. Further, scene-based video segments can be directly provided subsequently, thereby improving video segmentation efficiency. That is, via the logical segmentation and/or physical segmentation, the requirements of different scenarios are met.

Figure 1B:
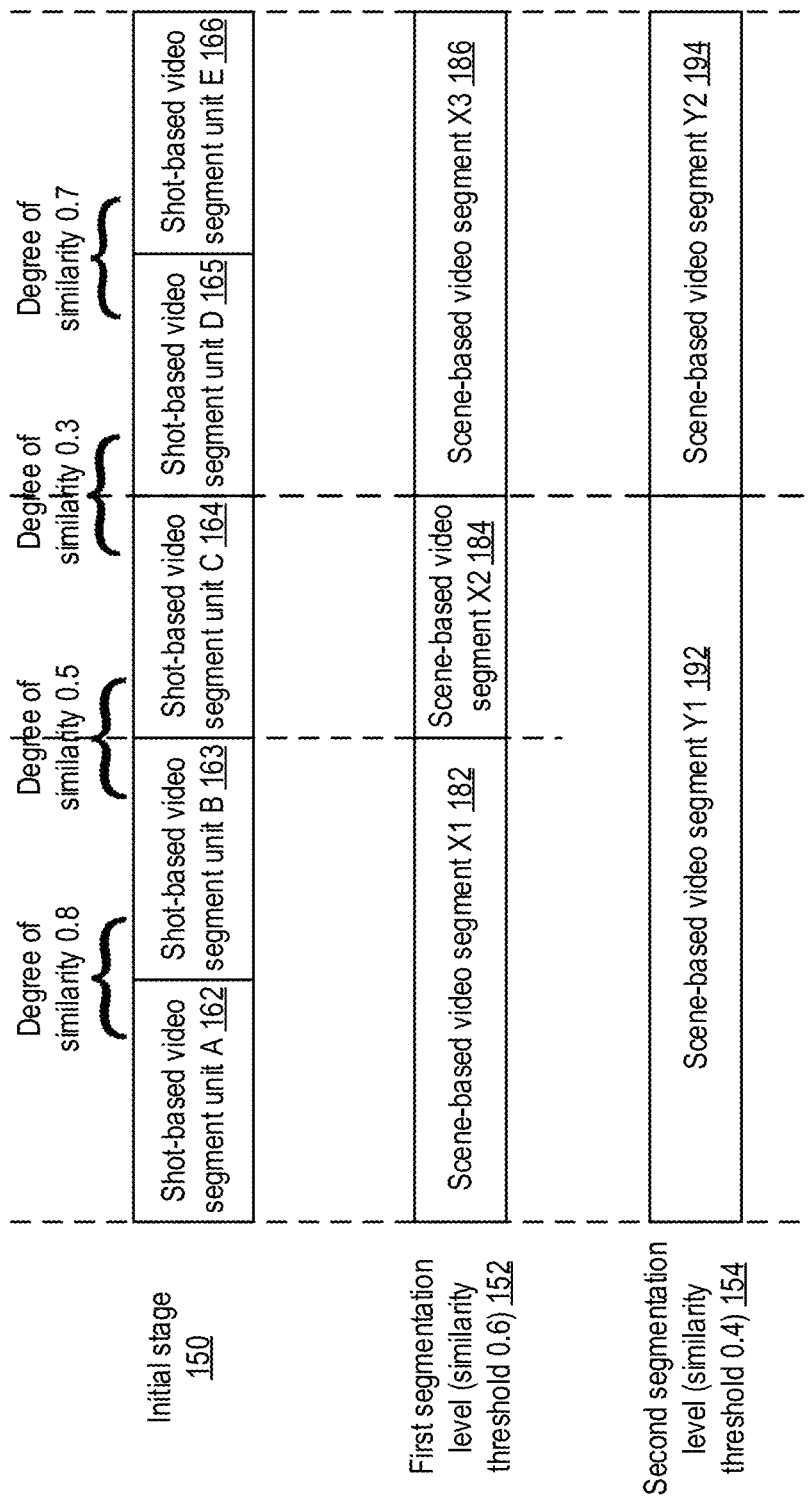
FIG. 1B is a block diagram illustrating an exemplary video segmentation according to some embodiments of the disclosure.

FIG. 1B is a block diagram illustrating video segmentation according to some embodiments of the disclosure.

In this example, for ease of illustration, a brief description is provided using an example of five initial units of shot-based video segments (e.g., in an initial stage 150) and two segmentation levels (152) and (154). However, the solutions for video processing provided by embodiments of the disclosure can be applied to more complex scenarios in actual applications In the illustrated embodiment, it is assumed that the initial units of shot-based video segments are five single-shot video segments A (162), B (163), C (164), D (165), and E 9166), the degrees of similarity associated with the five segments are shown in Table 1 in the following.

TABLE 1

|   | A | B | C | D | E |
|---|---|---|---|---|---|
| A | — | 0.8 | 0.5 | 0.3 | 0.1 |
| B | 0.8 | — | 0.5 | 0.2 | 0.1 |
| C | 0.5 | 0.5 | — | 0.3 | 0.1 |
| D | 0.3 | 0.2 | 0.3 | — | 0.7 |
| E | 0.1 | 0.1 | 0.1 | 0.7 | — |

TABLE 1-continued

Here, it is further assumed that a similarity threshold configured for a first segmentation level (152) is 0.6, and a similarity threshold configured for a second segmentation level (154) is 0.4.

Based on the aforementioned configurations, as shown in Table 1, for the first segmentation level (152), the degree of similarity between the shot-based video segments A (162) and B (163) is 0.8; the degree of similarity between the shot-based video segments B (163) and C (164) is 0.5; the degree of similarity between the shot-based video segments C (164) and D (165) is 0.3; and the degree of similarity between shot-based video segments D (165) and E (166) is 0.7. Given this, at the first segmentation level (152), segments A (162) and B (163) are merged, and segments D (165) and E (166) are merged. As such, the scene-based video segments formed at the first segmentation level (152) include X1 (182) (including segments A and B), X2 (184) (including segment C), and X3 (186) (including segments D and E). In some embodiments, scene-based video segments X1, X2, and X3 are used as units of shot-based video segments at the second segmentation level.

At the second segmentation level (154), it is assumed that a configured similarity threshold is 0.4. The degree of similarity between the shot-based video segments A (162) and B (163) is 0.8; the degree of similarity between B (163) and C (164) is 0.5; the degree of similarity between C (164) and D (165) is 0.3; and the degree of similarity between D (165) and E (166) is 0.7. Therefore, at the second segmentation level (154), segments A, B, and C are merged, and segments D and E are merged. As such, the scene-based video segments formed at the second segmentation level include Y1 (192) (including segments A, B, and C) and Y2 (194) (including segments D and E).

This way, via the aforementioned process, corresponding to the two segmentation levels, the scene-based video segments of different granularities are generated. The greater the similarity threshold, the lower the granularity; on the contrary, the lower the similarity threshold, the greater the granularity. As such, different requirements can be met.

In this embodiment, units of shot-based video segments are used as an elementary unit for processing. At the plurality of segmentation levels (e.g., representing segmentation granularities), the video is segmented, based on the degrees of similarity associated with the units of shot-based video segments, into a plurality of scene-based video segments having the granularities matching that of the plurality of segmentation levels. This way, different segmentation levels are configured to correspond to the scene-based video segments of different granularities. Therefore, scene segmentation of different granularities is performed to meet different requirements without manual operations, thereby greatly improving the efficiency of scene segmentation and reducing labor costs.

In some embodiments, the method for video processing illustrated in this embodiment is executed by any appropriate electronic device having data processing functionality. For example, such electronic devices include but are not limited to a server, a cloud device, a PC machine, or the like.

Figure 2A:
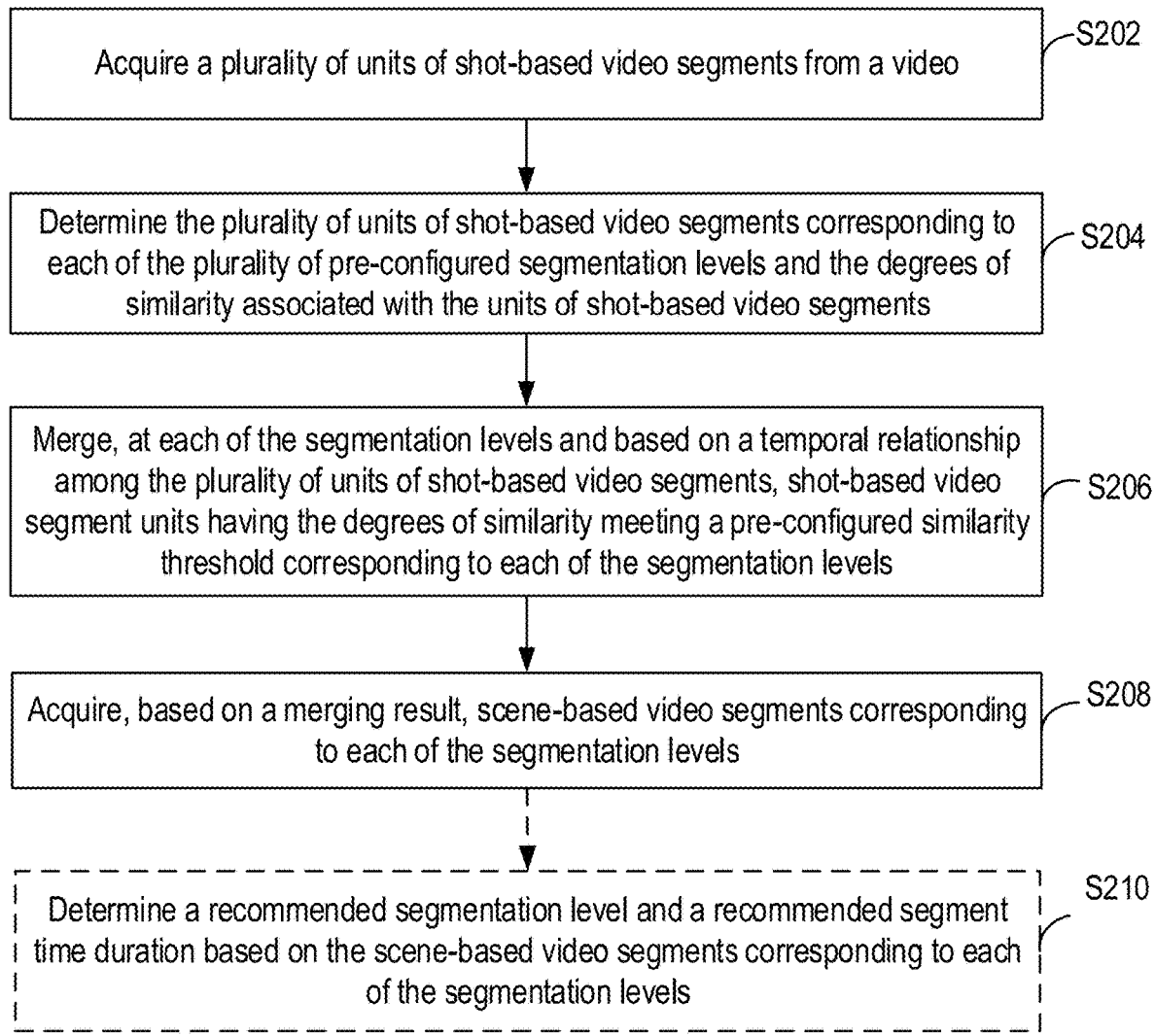
FIG. 2A is a flow diagram illustrating a method for video processing according to some embodiments of the disclosure.

FIG. 2A is a flow diagram illustrating a method for video processing according to some embodiments of the disclosure. In some embodiments, and as shown in FIG. 2A, the method for video processing includes the following steps.

Step S202: acquire a plurality of units of shot-based video segments from a video to be segmented.

In some embodiments, a unit of shot-based video segments is a video segment corresponding to a single shot or video segments including a plurality of shots for processing as a whole. In some embodiments, any specific form can be configured based on actual requirements.

Step S204: for each of a plurality of pre-configured segmentation levels, determine a plurality of units of shot-based video segments corresponding to each of the plurality of segmentation levels and the degrees of similarity associated with the units of shot-based video segments.

As described above, the number of segmentation levels can be configured based on actual requirements, without limitation. Further, in some embodiments, a plurality of units of shot-based video segments corresponding to each of the plurality of segmentation levels are the same sets of units, such as the initially acquired units of shot-based video segments. In other embodiments, the plurality of units of shot-based video segments corresponding to each of the plurality of segmentation levels are different sets of units, such as scene-based video segments at a previous level designated as the units of shot-based video segments at a current level.

In some implementations, the degrees of similarity associated with a plurality of units of shot-based video segments are determined by acquiring multi-modal feature(s) for each of the plurality of units of shot-based video segments; and acquiring the degrees of similarity associated with the units of shot-based video segments based on the multi-modal feature(s) of each of the plurality of units of shot-based video segments.

In some embodiments, the multi-modal feature(s) include(s) a visual feature, a speech feature, and a textual feature. In this case, the acquiring of a multi-modal feature for each of the plurality of units of shot-based video segments includes: acquiring a visual feature, a speech feature, and a textual feature for each of the plurality of units of shot-based video segments; and combining the visual feature, the speech feature, and the textual feature to obtain the multi-modal feature for each of the plurality of units of shot-based video segments.

As the multi-modal feature reflects the video features of a unit of video segments from a plurality of perspectives, the degrees of similarity associated with the units of shot-based video segments are determined with more accuracy and effectiveness. Further, the multi-modal feature can be acquired by using any suitable method without limitation.

In one implementation, when a unit of shot-based video segments is a shot, a shot boundary detection is performed on the video first to perform segmentation based on shots (e.g., perform single-shot segmentation) to obtain a plurality of segments at shot levels. Here, the shot boundary detection can be implemented using any suitable method including, but not limited to, a continuous frame subtraction method, a histogram subtraction method, a spatio-temporal slice method, and the like.

Next, a multi-modal feature for each shot is extracted by: acquiring, based on a shot segmentation result, a plurality of units of shot-based video segments (e.g., a plurality of shots) in the unit of a single shot; using a convolutional neural network (CNN) or a color histogram to perform feature extraction on the plurality of units of shot-based video segments, respectively to obtain features for each of the plurality of units of shot-based video segments, the features including the multi-modal features of the visual feature, the speech feature, the textual feature, and the like; combining the features of each modality (e.g., performing fusion and then $_2$normalization) to obtain a final feature for each of the plurality of units of shot-based video segments.

Step S206: merge, at each of the segmentation levels and based on temporal relationships among the plurality of units of shot-based video segments, the units of shot-based video segment units having the degrees of similarity meeting a pre-configured similarity threshold that corresponds to each of the segmentation levels.

In various embodiments, each of the segmentation levels corresponds to a different pre-configured degree of similarity threshold for performing scene segmentation at different granularities.

In one implementation, at each of the segmentation levels and based on the temporal relationships among the plurality of corresponding units of shot-based video segments, at least one shot-based video segment set is obtained. Here, the shot-based video segment set includes segments having a number of segment intervals within a pre-configured number range, and segments have the degrees of similarity meeting the pre-configured similarity threshold corresponding to the current segmentation level. Next, the units of shot-based video segments in each of the at least one shot-based video segment set are merged, respectively. In some embodiments, the pre-configured number range is configured based on requirements to achieve a balance between quantity and efficiency. In one example, the pre-configured number is 5, or the like, without limitation. This way, not only excessively fine segmentation resulting in an excessively large amount of computation and not meeting requirements is avoided, but an appropriate granularity is ensured.

In some embodiments, when at least one shot-based video segment set of a number of segment intervals that are within the pre-configured number range and including segments having the degrees of similarity meeting the pre-configured similarity threshold corresponding to the current segmentation level is acquired, it is determined, among a pre-configured number of units of shot-based video segments adjacent to a reference unit of shot-based video segments, whether there is a unit of shot-based video segments having a degree of similarity to the reference unit of shot-based video segments that meets the pre-configured similarity threshold corresponding to the current segmentation level. If so, the unit of shot-based video segments is designated as a new reference unit of shot-based video segments, and the process returns to continuing to execute the operation of determining, among a pre-configured number of units of shot-based video segments adjacent to a reference unit of shot-based video segments, whether there is a unit of hot-based video segments having the degree of similarity to the reference shot-based video segment unit that meets the pre-configured similarity threshold corresponding to the current segmentation level. This operation is performed until a determination result indicates that there are no units of shot-based video segments meeting the pre-configured similarity threshold. Subsequently, the units of shot-based video segments between the plurality of reference units of shot-based video segments meeting the pre-configured similarity threshold are classified as a shot-based video segment set. In some embodiments, when a unit of shot-based video segments having the degree of similarity to the reference unit of shot-based video segments that meets the pre-configured similarity threshold corresponding to the current segmentation level is not present, a shot-based video segment set is generated based on the current reference unit of shot-based video segments.

In some embodiments, a reference unit of shot-based video segments includes any suitable segment unit selected in an application. In some embodiments, initially, a unit of shot-based video segments is used as the reference unit of shot-based video segments (e.g., a starting shot-based video segment unit) to determine whether, within the pre-configured number range, there is a unit of shot-based video segments having the degree of similarity that meets the pre-configured similarity threshold. If so, the unit of shot-based video segments present in the range is used as a new reference unit of shot-based video segments. In turn, it is determined whether, within the pre-configured number range, there is a segment unit having the degree of similarity to the new reference unit of shot-based video segments that meets the pre-configured similarity threshold. Similarly, a continuous determination is performed until a segment unit having the degree of similarity meeting the pre-configured similarity threshold is not present in the pre-configured number range of the latest reference unit of shot-based video segments. At this point, the aforementioned segment units starting from the starting reference unit of shot-based video segments to the last reference unit of shot-based video segments are classified into one set to form one scene-based video segment subsequently.

In various embodiments, the aforementioned methods provide accurate segmentation of scene-based video segments at a current segmentation level.

In one implementation, for an exemplary unit of shot-based video segments of a single shot, the degree of similarity between every two of all of the shots is constructed based on the multi-modal feature acquired in step S204 (e.g., referring to Table 1). As such, a similarity degree matrix is obtained, the length and the width of which are both the number of shots in the video. Further, a segmentation level is configured. In some embodiments, a relatively large level value L (e.g., L=10) is configured based on empirical values. In some embodiments, no limitation is imposed on a segment's time duration.

In this example, on the similarity degree matrix, adjacent shots are merged based on a temporal relationship among the shots, e.g., along the time dimension, respectively. In one implementation, a process includes the following.

Step A): assuming that the current segmentation level is an l-th level, the threshold is configured as $\sigma=0.8-l*(0.8-0.1)/L$, where $1<=l<=L$.

In various embodiments, a configuration of the threshold is not limited to the aforementioned method. In actual applications, other configuration methods can also be used. For example, a minimum value of the threshold u can be configured to be equal to or greater than a mean value of the similarity degree matrix, based on an empirical value, and the like. The greater the value of threshold u, the finer the scene granularities; on the contrary, the lower the threshold, the coarser the scene granularities.

Step B): assuming that an i-th unit of shot-based video segments ($1<=i<=N$, where N is the number of units of shot-based video segments at each of the segmentation levels, and initially i=1, a reference shot-based video segment unit) is a current unit of shot-based video segments, it is determined whether the degree of similarity between the i-th unit of shot-based video segments and the i+1-th unit of shot-based unit of video segments (e.g., a cosine distance therebetween calculated) is greater than u. Step 1): If the degree of similarity is not greater than u, the i+2-th unit of shot-based video segments is subjected to determination, until at most n=5 units of shot-based video segments are subjected to determination. If there are no units of shot-based video segments meeting the condition (e.g., the degree of similarity to the i-th unit of shot-based video segments greater than $\sigma$) found in the range of the n units of shot-based video segments, the i-th unit of shot-based video segments remains unchanged, used as an independent unit of shot-based video segment designated as a scene-based video segment of the l-th level (e.g., a scene-based video segment including only one unit of shot-based video segments). Step 2): If a unit of shot-based video segments meeting the condition is found in the range of the n units of shot-based video segments, the unit of shot-based video segments meeting the condition is used as a new starting point (e.g., a new reference unit of shot-based video segments), and step 1) is repeated until no units of shot-based video segments meeting the condition are found. Assuming that at step 2) m units of shot-based video segments are acquired, the m units of shot-based video segments are merged into one scene-based video segment.

Subsequently, a j-th unit of shot-based video segments is used as a reference unit of shot-based video segments, and above-described steps 1) and 2) are executed again until all units of shot-based video segments at the l-th level are processed.

Step C): when l=l+1 (e.g., l increased by 1), it is determined whether the new value of l is less than or equal to L. If so, the process returns to step A) to continue processing. Otherwise, the video segmentation process is ended.

This way, scene segmentation at different segmentation levels is performed for the video, thereby obtaining a plurality of scene-based video segments of different granularities respectively corresponding to the plurality of segmentation levels.

In some embodiments, step S206 includes: at each of the segmentation levels and based on the temporal relationship among the plurality of units of shot-based video segments, merging the units of shot-based video segments having the degrees of similarity meeting the pre-configured similarity threshold that corresponds to the current segmentation level; to obtain a plurality of scene-based video segments corresponding to the current segmentation level; computing the degrees of similarity associated with the plurality of scene-based video segments, and designating the plurality of scene-based video segments corresponding to the current segmentation level as a plurality of units of shot-based video segments at the subsequent segmentation level; and merging the units of shot-based video segments at the subsequent segmentation level based on the computed degrees of similarity and the designated plurality of units of shot-based video segments.

In some embodiments, after the aforementioned step B), the merged shot at the l-th segmentation level (e.g., the scene-based video segment at the l-th segmentation level) is designated as the units of shot-based video segments at the subsequent segmentation level. That is, each scene of the l-th segmentation level is used as a merged unit at the subsequent segmentation level. As such, the aforementioned step B) is followed by a step B+1), at which a plurality of scene-based video segments at the l-th segmentation level are designated as a plurality of new units of shot-based video segments, and the degrees of similarity associated with the plurality of scene-based video segments are calculated and used as the degrees of similarity associated with the plurality of new units of shot-based video segments. Subsequently, step C) is executed. In one implementation, the degrees of similarity associated with a plurality of scene-based video segments is computed by averaging the feature values of units of shot-based video segments included in each scene-based video segment, using the average value as a feature value for the current scene-based video segment, and determining a degree of similarity between every two scene-based video segments by calculating a cosine distance accordingly. This way, the acquired segmentation results are utilized to a maximized extent, thereby improving segmentation efficiency.

Figure 2B:
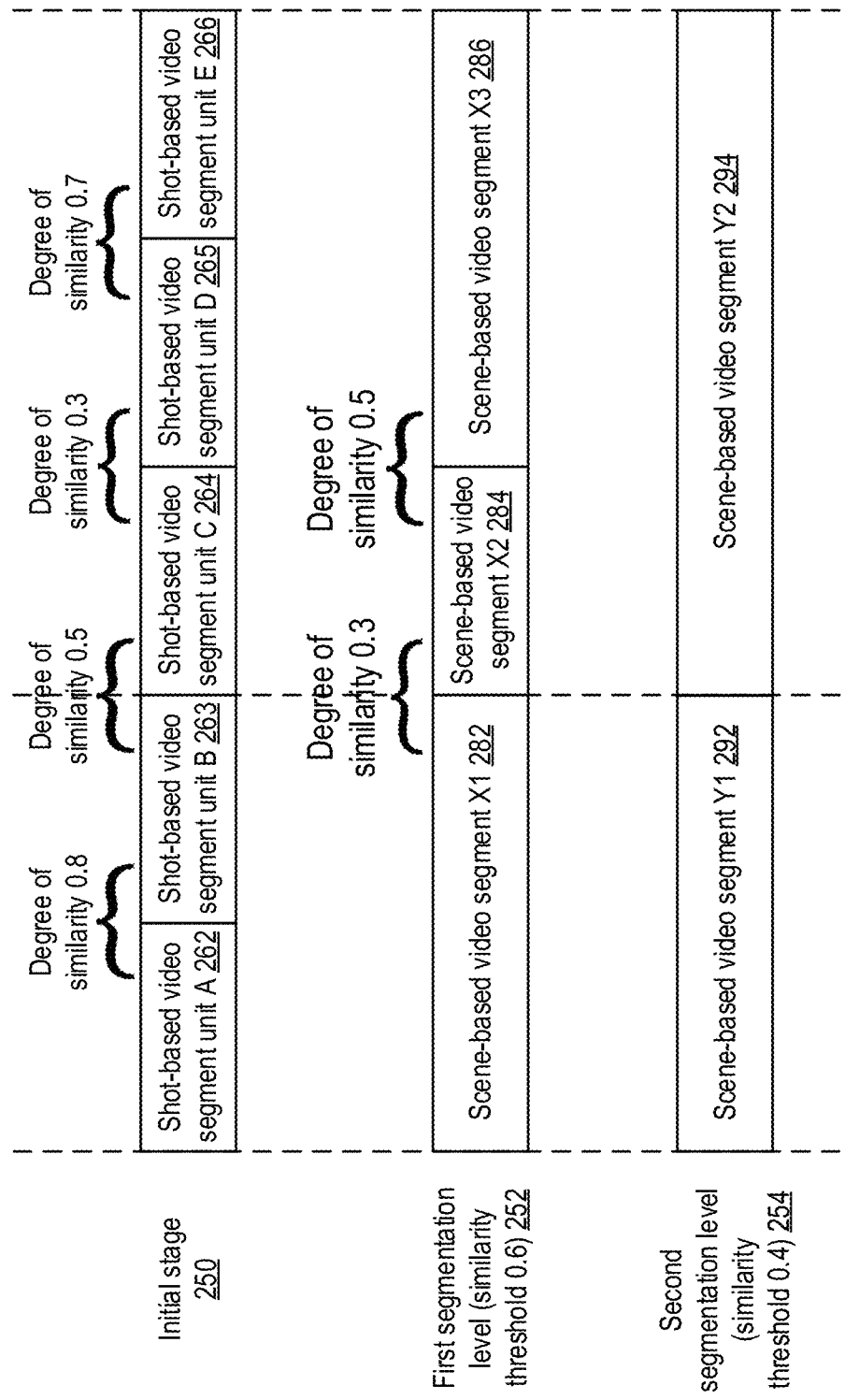
FIG. 2B is a block diagram illustrating an exemplary result of video segmentation according to some embodiments of the disclosure.

FIG. 2B is a block diagram illustrating video segmentation according to some embodiments of the disclosure. Still using the same example of FIG. 1B, the degrees of similarity associated with the five initial units (e.g., in an initial stage of 250) of shot-based video segments A (262), B (263), C (264) D (265), and E (266) are shown in Table 1.

Assuming that the similarity threshold corresponding to the first segmentation level (252) is 0.6, and the similarity threshold corresponding to the second segmentation level (254) is 0.4, the processing performed at the first segmentation level (252) is the same as the embodiment illustrated with connection to FIG. 1B. In other words, three scene-based video segments X1 (282) (including units A and B), X2 (284) (including unit C), and X3 (286) (including units D and E) are acquired for the first segmentation level.

In this example and different from the embodiment described with connection to FIG. 1B, is after segments of X1 (282), X2 (284), and X3 (286) are acquired, the degrees of similarity associated with those three segments are calculated. It is assumed that the calculated degrees of similarity are shown in Table 2 in the following.

TABLE 2

|    | X1  | X2  | X3  |
|----|-----|-----|-----|
| X1 | —   | 0.3 | 0.2 |
| X2 | 0.3 | —   | 0.5 |
| X3 | 0.2 | 0.5 | —   |

Here, at the second segmentation level (254), X1 (282), X2 (284), and X3 (286) are used as new units of shot-based video segments. In this example, the degree of similarity between X1 (282) and X2 (284) is 0.3 and does not meet the pre-configured similarity threshold 0.4 corresponding to the second segmentation level. The degree of similarity between X2 (284) and X3 (286) is 0.5 and meets the pre-configured similarity threshold 0.4 corresponding to the second segmentation level. Therefore, X2 (284) and X3 (286) are merged. Accordingly, as shown herein FIG. 2B, the scene-based video segments Y1 (292) (including segment X1) and Y2 (294) (including segments X2 and X3) are acquired at the second segmentation level.

It should be noted that the above-described example is a simplified description of actual processing. Embodiments of the disclosure apply to complex scenarios without limitation.

Step S208: obtain, based on a merging result, scene-based video segments corresponding to each of the segmentation levels. In some embodiments, a plurality of scene-based video segments of different granularities that correspond to each of the segmentation levels is obtained.

This way, the video is segmented into scene-based segments based on the plurality of segmentation levels. In some embodiments, based on this segmentation result, the method further includes step S210.

Step S210: determine a recommended segmentation level and a recommended segment time duration based on the scene-based video segments corresponding to each of the segmentation levels.

In some embodiments, step S210 includes: acquiring a plurality of scene purity degrees corresponding to each of the segmentation levels; determining, based on the plurality of scene purity degrees, a segmentation level having a scene purity degree closet a pre-configured scene purity degree as a recommended segmentation level; and determining the longest time duration associated with scene-based video segments at the recommended segmentation level as a recommended segment time duration.

In various embodiments, the recommended segmentation level and the recommended segment time duration are used to provide recommendations to users having various requirements (e.g., a user requiring video segmentation to be performed) such that to facilitate the users having different requirements with selection and ease in operation.

In some embodiments, a scene purity degree refers to the degree of similarity among the units of shot-based video segments in a single scene-based video segment. In various embodiments, the pre-configured scene purity degree can be configured based on requirements, without limitation.

In one example, the scene purity degree is calculated for each of the segmentation levels. Using the l-th level as an example, the degrees of similarity between the units of shot-based video segments of each of the plurality of scene-based video segments at the l-th level is calculated. Next, the degrees are averaged to acquire the scene purity degree corresponding to the scene-based video segment. In turn, an average value of all the scene purity degrees at the l-th level is acquired and used as a scene purity degree for the l level. As such, a segmentation level having the scene purity degree greater than or closest to τ=0.4 is selected as a segmentation level for recommendation to the user. Further, the longest time duration associated with the scene-based video segments at the segmentation level is used as a segment time duration recommended to the user.

Accordingly, via the aforementioned process, not only the scene segmentation is performed at different granularities, but the segmentation level and the segment time duration are recommended to the user, thereby greatly meeting subsequent requirements of the user.

In this illustrated embodiment, the unit of shot-based video segments is used as an elementary unit for processing. At one or more segmentation levels (e.g., representing segmentation granularities), the units of shot-based video segments are merged based on the degrees of similarity associated with the units of the shot-based video segments to form a plurality of scene-based video segments having the granularity matching that of each of the segmentation levels. This way, scene segmentation is performed at different granularities to meet the different requirements without manual operations, thereby greatly improving the efficiency of scene segmentation and reducing labor costs.

In various embodiments, the method for video processing according to this embodiment can be executed by any suitable electronic device having data processing functionality. Such electronic devices include, but are not limited to, a server, a cloud device, a PC machine, and the like.

Figure 3A:
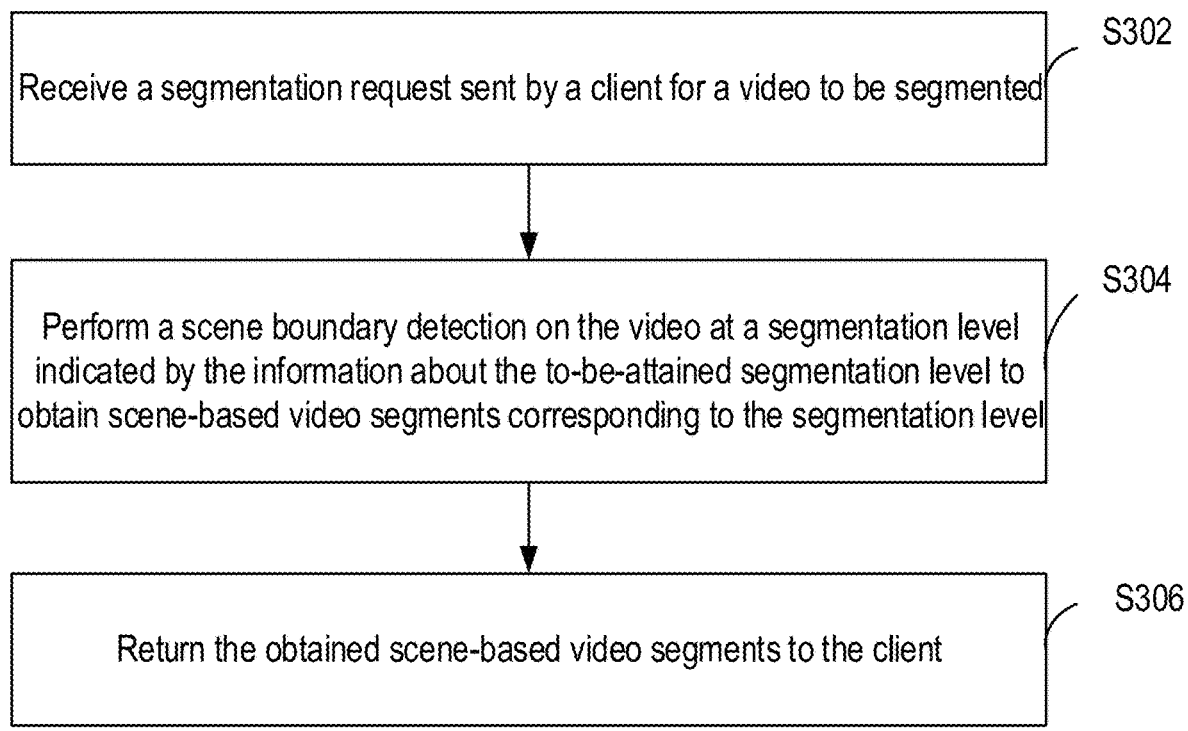
FIG. 3A is a flow diagram illustrating a method for video processing according to some embodiments of the disclosure.

FIG. 3A is a flow diagram illustrating a method for video processing according to some embodiments of the disclosure. In some embodiments, and as shown in FIG. 3A, after the segmentation into scene-based video segments at different segmentation levels, a service is provided for a subsequent application based on the result. In this embodiment, the method for video processing is illustrated from the perspective of providing a service based on the segmentation result. In some embodiments, and as shown in FIG. 3A, the method for video processing includes the following steps.

Step S302: receive a segmentation request sent by a client to segment a video.

In some embodiments, the segmentation request includes the information about a to-be-attained segmentation level.

In one implementation, the segmentation request is generated by generating the segmentation request based on the information about the to-be-attained segmentation level input by a user. That is, the segmentation request is generated after the user manually inputs the corresponding information, thereby improving the flexibility of use by the user. Here, in some examples, a range of the to-be-attained segmentation level is configured in a range of 4 to 10.

In one implementation, the segmentation request is generated by sending the information about a recommended segmentation level for the video to the client such that the client displays the recommended level to the user via a display interface. Next, the segmentation request, which is generated based on the information about the to-be-attained segmentation level input by the user based on the displayed recommended segmentation level, is received. The obtaining of recommended segmentation level is substantially similar to the embodiments above-described, and the details of which are not repeated herein.

In some embodiments, the segmentation request further includes the information about a to-be-attained segment time duration.

In some embodiments, the information about the to-be-attained segment time duration includes the recommended segment time duration as determined in the above-described embodiments. In some embodiments, such segment time duration is manually provided by the user. When the recommended segment time duration is utilized, the information about the recommended segmentation level of the video and information about the recommended segment time duration is sent to the client such that the client displays the segmentation level and segment time duration to the user via the display interface. This way, the user can select for inputting. When manual input from the user is utilized, scene-based video segments corresponding to the to-be-attained segmentation level are provided to the user in advance. After viewing the scene-based video segments, the user selects the longest scene-based video segment among the scene-based video segments, the time duration of which is used as an operable time duration. In turn, the user inputs the operable time duration as the to-be-attained segment duration.

In some embodiments, the segmentation request further includes the information about the requested target content. The information about the target content is used to indicate the content the user intends to acquire from the video. For example, such content includes content related to details of a product, content related to a role, a plot, a scene, and the like.

In some embodiments, in determining the to-be-attained segmentation level and the to-be-attained segment time duration at the client, when the user inputs the corresponding information, the input of the user is used. When there is no user input, the recommended segmentation level and the recommended segment time duration are used.

Step S304: perform a scene boundary detection on the video at the segmentation level indicated by the information about the to-be-attained segmentation level to obtain scene-based video segments corresponding to the segmentation level.

In some embodiments, the obtaining of the scene-based video segments are substantially similar to the embodiments of video processing above-described, the details of which are not repeated.

In this illustrated embodiment, it is assumed that the scene-based video segments corresponding to the segmentation level obtained via the methods described above are configured to be logical segments rather than physical segments. That is, although segmentation is performed at a segmentation level to acquire scene-based video segments, these scene-based video segments are still included in the video, not separated as independent segment data. Via the scene boundary detection, these scene-based video segments are separated into independent physical segments.

In one example, via the aforementioned segmentation, three scene-based video segments X1, X2, and X3, are obtained corresponding to the first segmentation level of the video X. However, the three scene-based video segments are still included in the video X. Via this step, three segments X1, X2, and X3 independent of video X are generated.

In one implementation, the scene boundary is detected based on a multi-modal feature of each of the units of shot-based video segments and the to-be-attained segmentation level. Based on the to-be-attained segmentation level, shots included in each of the scene-based video segments corresponding to the level are acquired. Via the multi-modal feature, a boundary of each of the scene-based video segments in the video is determined. Thus, each of the scene-based video segments is separated into an independent segment.

In some embodiments, when independent scene-based video segments are obtained as described above, the scene boundary detection does not need to be performed, and corresponding scene-based video segments are directly provided based on the segmentation request.

Further, when the segmentation request includes the information about the to-be-attained segment time duration, the time duration of the obtained scene-based video segment may be the same as the to-be-attained segment time duration or the closest to the to-be-attained segmentation time duration. That is, if a server does not include a scene-based video segment having a time duration identical to the to-be-attained segment time duration, a scene-based video segment having the time duration closest to the to-be-attained segmentation time duration is returned to the client.

Step S306: return the obtained scene-based video segments to the client.

In one example, the three independent scene-based video segments acquired at the first segmentation level are returned to the client.

In some embodiments, when the segmentation request further includes the information about the to-be-attained segment time duration, among the obtained scene-based video segments, a scene-based video segment having h a time duration matching a time duration indicated by the information about the to-be-attained segment time duration is determined. In turn, the matching scene-based video segment is returned to the client. This way, the user requirements are precisely met, and the amount of data transmission is reduced.

In some embodiments, when the segmentation request further includes the information about the target content, the returning of the obtained scene-based video segments to the client includes: acquiring the content information of the scene-based video segments corresponding to the segmentation level; determining, among the scene-based video segments, a scene-based video segment having the content information matching the information about the target content; and returning the matching scene-based video segment to the client. In this case, the server (e.g., a server, a cloud service) removes, based on the information about the target content, segments irrelevant to the target content from the scene-based video segments corresponding to the segmentation level, the irrelevant segments not returned the same to the client. In some embodiments, segments related to the target content are combined to generate a respective content highlight set corresponding to the target content. In some embodiments, the content information of the scene-based video segment is pre-configured, or acquired by detection. In some embodiments, such content information is captured in the form of summary information and/or in the form of a featured image. When the form of a featured image is used, upon matching to the target content, detection is performed on the content of the featured image, the result of which is used in matching with the target content.

Figure 3B:
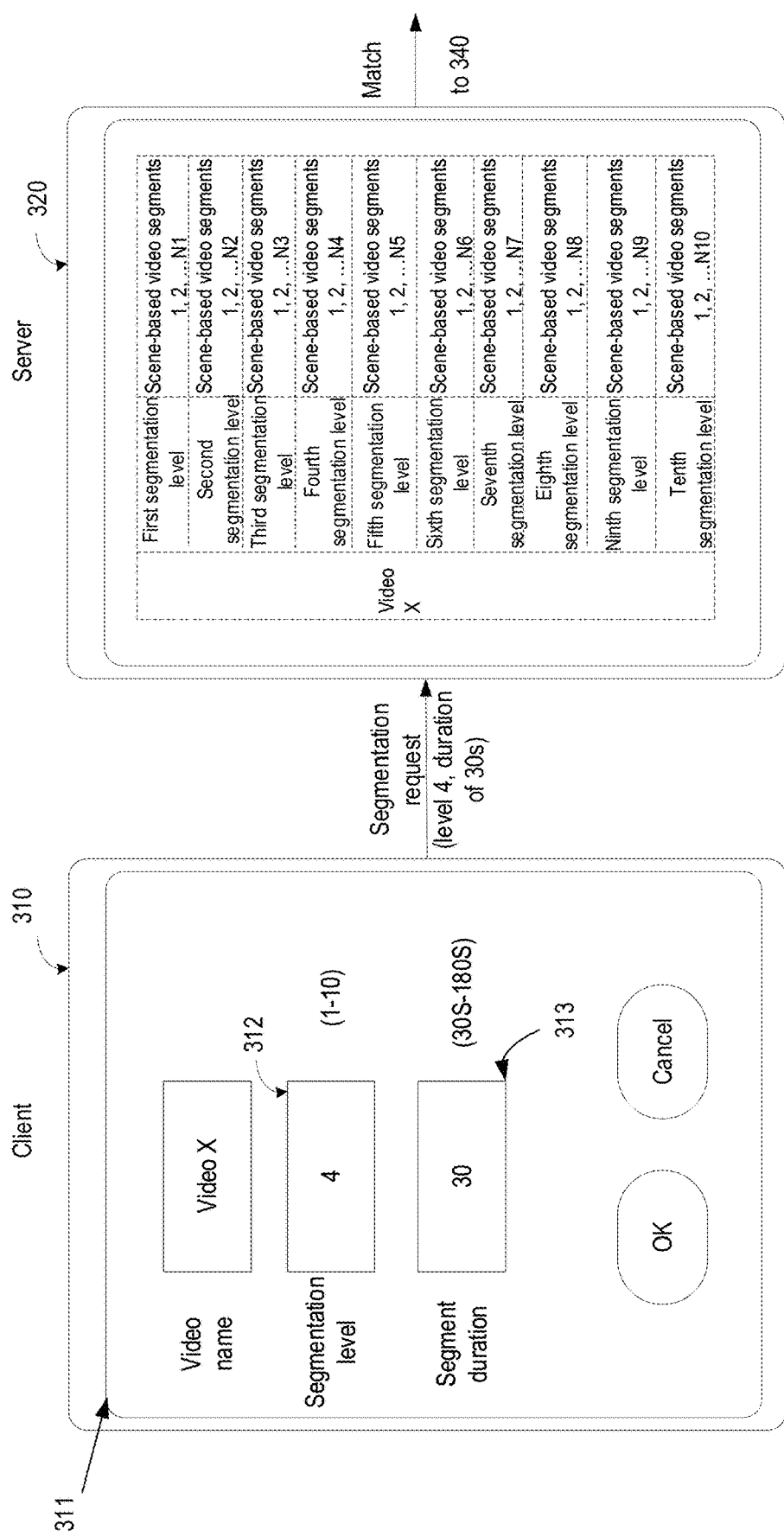
FIGS. 3B-3C are block diagrams illustrating exemplary scenarios according to some embodiments of the disclosure.
Figure 3C:
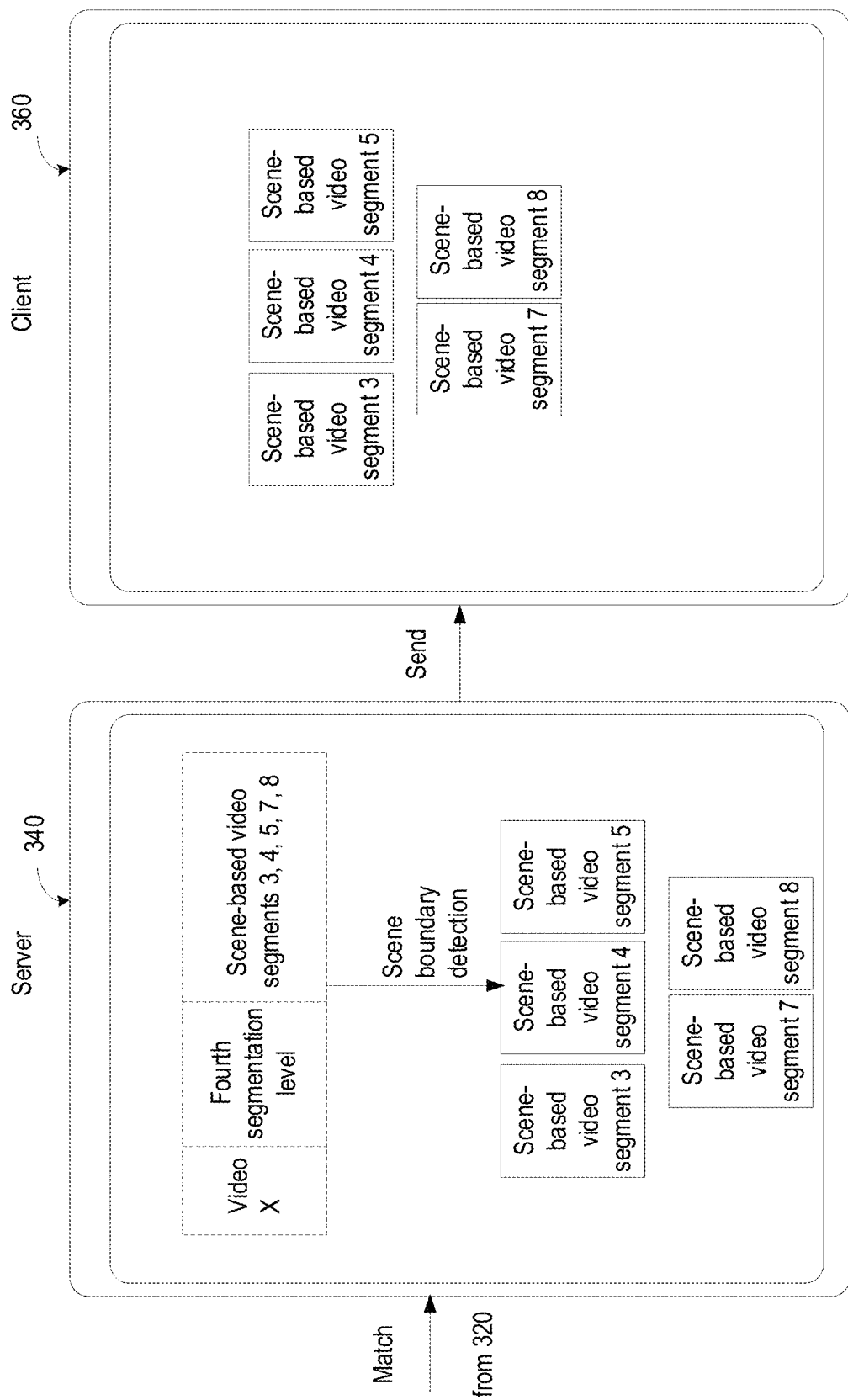

FIGS. 3B-3C are block diagrams illustrating exemplary scenarios according to some embodiments of the disclosure.

In some embodiments and as shown in FIGS. 3B-3C, it is assumed that video X to be recommended has been segmented into ten (10) segmentation levels, each level corresponding to a scene-based video segment of different granularity. In some embodiments, when the server does not have the video that has been segmented, the video is uploaded to the server, which utilizes the methods as above described to segment the video. In one example, a corresponding segmentation result is stored at the server.

As shown in FIGS. 3B-3C, selectable levels and durations are displayed to a user via a user interface (311) of the client in a first state (310). Here, it is assumed that the user enters "4" in a level input box (312) and enters "30" (seconds) in a duration input box (313). Accordingly, the client in a first state (310) generates a corresponding segmentation request for sending to a back-end server in a first state (320). Upon receiving the segmentation request, the server in a first state (320) acquires "4" as the information about the to-be-attained segmentation level, and searches for the fourth segmentation level of the video X, and the information about scene-based video segments corresponding to the fourth level. In this example, it is assumed that the fourth segmentation level corresponds to 10 scene-based video segments, five (5) of which has a time duration of 30 seconds (as shown herein, it is assumed that the five (5) scene-based video segments are segments 3, 4, 5, 7, and 8). Next, the server in a second state (340) performs scene boundary detection first to acquire five (5) independent scene-based video segments and sends to the client in a second state (360) all the five (5) scene-based video segments having the duration of 30 seconds. Upon receiving the five (5) scene-based video segments, the client in a second state (360) displays the video segments to the user for selection. In one example, when the user determines to select the third scene-based video segment after browsing, the client publishes the scene-based video segment to a corresponding video website such that to recommend the selected scene-based video segment to viewers of the video website.

Further, embodiments of the disclosure are not limited to the aforementioned video recommendation scenario. For instance, in the scenarios such as a video trailer preview, a video introduction, and highlights of video segment recommendation, one or more of the scene-based video segments are determined in a segmentation level required by the user, via the methods as above-described with reference to the video recommendation scenario. This way, the corresponding processing that meets the requirements is performed.

In this illustrated embodiment, the unit of shot-based video segments is used as an elementary unit for processing. At one or more segmentation levels (e.g., representing segmentation granularities), the units of shot-based video segments are merged based on the degrees of similarity associated with the units of the shot-based video segments to form a plurality of scene-based video segments having the granularity matching that of each of the segmentation levels. This way, scene segmentation is performed at different granularities to meet the different requirements without manual operations, thereby greatly improving the efficiency of scene segmentation and reducing labor costs.

In various embodiments, the method for video processing can be executed by any suitable electronic device having data processing functionality. Such electronic device includes, but not limited to, a server, a cloud device, a PC machine, and the like.

Figure 4:
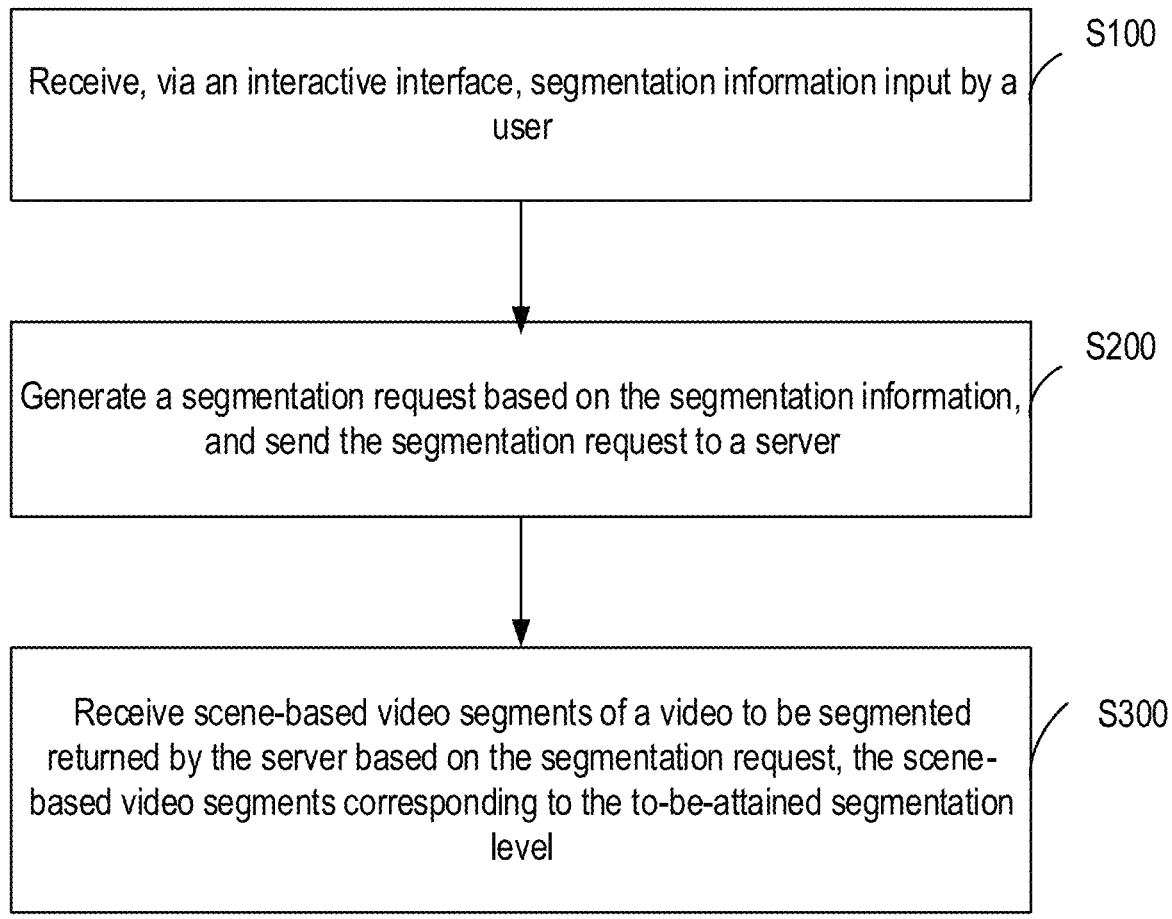
FIG. 4 is a flow diagram illustrating a method for video processing according to some embodiments of the disclosure.

FIG. 4 is a flow diagram illustrating a method for video processing according to some embodiments of the disclosure. In this embodiment, the method for video processing is illustrated from the perspective of a client. In some embodiments, and as shown in FIG. 4 the method for video processing includes the following steps.

Step S100: receive, via an interactive interface, segmentation information input by a user.

In some embodiments, the segmentation information includes the information about a video to be segmented and the information about a to-be-attained segmentation level for the video.

Based on the information about the video and the information about the to-be-attained segmentation level, it is determined with regard to which video the user intends to segment with which kind of granularity.

In one implementation, the segmentation information further includes the information about a to-be-attained segment time duration to indicate a time duration for a scene-based video segment required by the user.

In one implementation, the segmentation information further includes the information about the to-be-attained target content to indicate the video content required by the user.

In one implementation, when providing the segmentation information via the interactive interface, the user inputs the segmentation information directly. In one implementation, the user inputs the segmentation information based on a recommendation made by a server (e.g., a server or a cloud service) for the video. As such, in some embodiments, this step includes: receiving the recommendation information sent by the server, wherein the recommendation information includes the information about a recommended segmentation level and information about a recommended segment time duration determined based on segmentation processing performed on the video; displaying, via the interactive interface, the information about the recommended segmentation level and the information about the recommended segment time duration; and receiving the segmentation information input by the user based on the information about the recommended segmentation level and/or the information about the recommended segment time duration. Details with regard to the recommended segmentation level and the recommended segment time duration are substantially similar to those embodiments described above and not repeated herein.

Step S200: generate a segmentation request based on the segmentation information, and send the segmentation request to a server.

In various embodiments, the form and implementation of the segmentation request can be implemented using any suitable method based on actual situations, without limitations.

Step S300: receive scene-based video segments of a video returned by the server based on the segmentation request, the scene-based video segments corresponding to the to-be-attained segmentation level.

Details with regard to the scene-based video segment of the video from the server are substantially similar to those embodiments described above and not repeated herein.

In some embodiments, when the segmentation information further includes the information about the to-be-attained segment time duration, this step includes: receiving scene-based video segments of the video returned by the server based on the segmentation request, the scene-based video segments corresponding to the to-be-attained segmentation level, and the to-be-attained segment time duration.

In some embodiments, when the segmentation information includes the information about the to-be-attained segment duration, the time duration of the obtained scene-based video segment may be the same as the to-be-attained segment time duration or be closest to the to-be-attained segment time duration. That is, if a server does not have a scene-based video segment having a time duration identical to the to-be-attained segment time duration, a scene-based video segment having the time duration closest to the to-be-attained segment time duration is returned to the client.

In some embodiments, when the segmentation information further includes the information about the to-be-attained target content, this step includes: receiving scene-based video segments of the video returned by the server based on the segmentation request, the scene-based video segments corresponding to the required segmentation level. In one example, the scene-based video segment includes one or more scene-based video segments related to a product, a role, or a scene, or a video segment highlight set of target content, and the like. On the other hand, the scene-based video segments irrelevant to the target content are removed by the server, not returned to the client. In this illustrated embodiment, the method for acquiring scene-based video segments of different granularities is provided to the user at the client. As such, not only scene segmentation at different granularities meeting different requirements is performed, but the user at the client does not need to perform manual segmentation, thereby improving the video segmentation experience for the user.

In various embodiments, the method for video processing can be executed by any suitable electronic device having data processing functionality. Such electronic device includes, but not limited to, a terminal device such as a PC machine, and the like.

Figure 5:
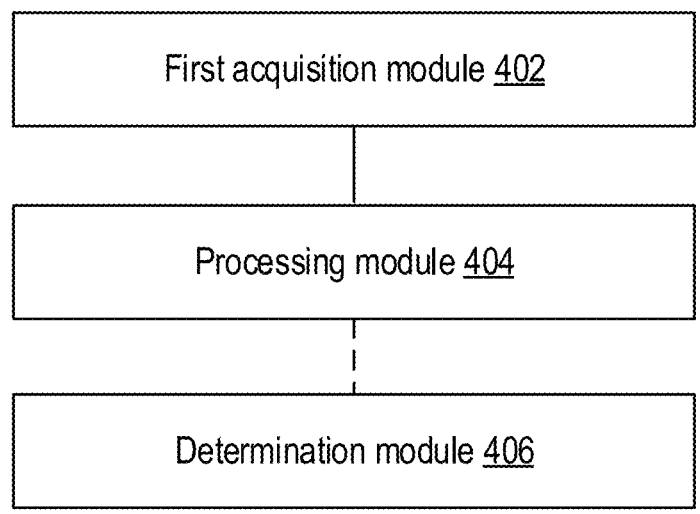
FIG. 5 is a block diagram illustrating an apparatus for video processing according to some embodiments of the disclosure.

FIG. 5 is a block diagram illustrating an apparatus for video processing according to some embodiments of the disclosure. In some embodiments and as shown in FIG. 5, the apparatus for video processing includes: a first acquisition module (402) configured to acquire a plurality of units of shot-based video segments from a video to be segmented; and a processing module (404) configured to segment, based on a plurality of pre-configured segmentation levels and the degrees of similarity associated with the units of shot-based video segments corresponding to each of the segmentation levels, the video into scene-based video segments of different granularities corresponding to the plurality of segmentation levels, respectively.

In one embodiment, the processing module (404) is configured to determine the plurality of units of shot-based video segments corresponding to each of the plurality of pre-configured segmentation levels and the degrees of similarity associated with the units of shot-based video segments; merge, at each of the segmentation levels and based on a temporal relationship among the plurality of units of shot-based video segments, units of shot-based video segments having the degrees of similarity meeting a pre-configured similarity threshold that corresponds to each of the segmentation levels; and obtain, based on a merging result, scene-based video segments corresponding to each of the segmentation levels.

In one embodiment, when merging, at each of the segmentation levels and based on a temporal relationship among the plurality of units of shot-based video segment, units of shot-based video segments having the degrees of similarity meeting a pre-configured similarity threshold that corresponds to each of the segmentation levels, the processing module (404), at each of the segmentation levels and based on the temporal relationship among the plurality of corresponding units of shot-based video segments, acquires at least one shot-based video segment set of the number of segment intervals within a pre-configured number range and including segments having the degrees of similarity meeting the pre-configured similarity threshold corresponding to the current segmentation level; and respectively merges units of shot-based video segments in each of the at least one shot-based video segment set.

In one embodiment, when acquiring at least one shot-based video segment set of the number of segment intervals within a pre-configured number range and including segments having the degrees of similarity meeting the pre-configured similarity threshold corresponding to the current segmentation level, the processing module (404) determines, among a pre-configured number of units of shot-based video segments adjacent to a reference unit of shot-based video segments, whether a unit of shot-based video segments having the degree of similarity to the reference unit shot-based video segments meeting the pre-configured similarity threshold corresponding to the current segmentation level is present; if so, designates the unit of shot-based video segments as a new reference unit of shot-based video segments, and returns to continuing to execute the operation of determining, among a pre-configured number of units of shot-based video segments adjacent to a reference unit shot-based video segments, whether a unit of shot-based video segments having the degree of similarity with the reference unit of shot-based video segments meeting the pre-configured similarity threshold corresponding to the current segmentation level is present, until a determination result indicates that a unit of shot-based video segments meeting the pre-configured similarity threshold is not present. Afterward, the processing module (404) classifies the units of shot-based video segments units between the plurality of reference units of shot-based video segments meeting the pre-configured similarity threshold into one shot-based video segment set.

In some embodiments, the processing module (404) is further configured to, when a unit of shot-based video segments having the degree of similarity to the reference unit of shot-based video segments meeting the pre-configured similarity threshold corresponding to the current segmentation level is not present, generate a shot-based video segment set based on the current reference unit of shot-based video segments.

In some embodiments, the processing module (404) is configured to, when merging, at each of the segmentation levels and based on a temporal relationship among the plurality of units of shot-based video segments, units of shot-based video segments having the degrees of similarity meeting a pre-configured similarity threshold corresponding to each of the segmentation levels: at each of the segmentation levels and based on the temporal relationship among the plurality of units of shot-based video segments, merge units of shot-based video segments having the degrees of similarity meeting the pre-configured similarity threshold corresponding to the current segmentation level to acquire a plurality of scene-based video segments corresponding to the current segmentation level; calculate the degrees of similarity associated with the plurality of scene-based video segments and designate the plurality of scene-based video segments corresponding to the current segmentation level as a plurality of units shot-based video segments at the subsequent segmentation level; and merge the units of shot-based video segments at the subsequent segmentation level based on the calculated degrees of similarity and the plurality of designated units of shot-based video segments.

In some embodiments, the first acquisition module (402) is further configured to acquire the degrees of similarity associated with the units of shot-based video segments by acquiring a multi-modal feature of each of the plurality of units of shot-based video segments; and acquiring the degrees of similarity associated with the units of shot-based video segments based on the multi-modal feature of each of the plurality of units of shot-based video segments.

In some embodiments, the first acquisition module (402), when acquiring a multi-modal feature of each of the plurality of units of shot-based video segments, acquires a plurality of units of shot-based video segments from a video to be segmented and acquires a visual feature, a speech feature, and a textual feature of each of the plurality of units of shot-based video segments; combines the visual feature, the speech feature, and the textual feature to acquire the multi-modal feature of each of the plurality of units of shot-based video segments; and acquires the degrees of similarity associated with units of the shot-based video segments based on the multi-modal feature of each of the plurality of units of shot-based video segments.

In some embodiments, the apparatus for video processing further includes: a determination module (406) configured to acquire a scene purity degree corresponding to each of the segmentation levels; determine, among the plurality of scene purity degrees, a level having a scene purity degree closest to a pre-configured scene purity degree as a recommended segmentation level; and determine the longest time duration of scene-based video segments at the recommended segmentation level as a recommended segment time duration.

In some embodiments, the apparatus for video processing implements the corresponding method of video processing illustrated in the embodiments above with similar benefits, the details of which are not repeated. Further, details of the implementation of functions of the modules in the apparatus for video processing that are substantially similar to the method embodiments described above are not repeated herein either.

Figure 6:
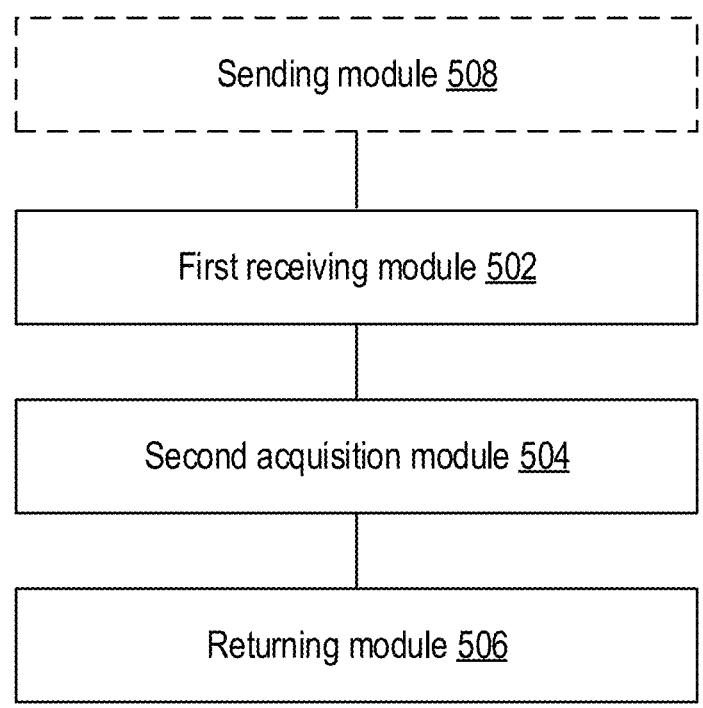
FIG. 6 is a block diagram illustrating an apparatus for video processing according to some embodiments of the disclosure.

FIG. 6 is a block diagram illustrating an apparatus for video processing according to some embodiments of the disclosure. In some embodiments and as shown in FIG. 6, the apparatus for video processing includes: a first receiving module (502) configured to receive a segmentation request sent by a client to segment a video, wherein the segmentation request includes the information about a to-be-attained segmentation level; a second acquisition module (504) configured to perform a scene boundary detection on the video at a segmentation level indicated by the information about the to-be-attained segmentation level to obtain scene-based video segments corresponding to the segmentation level; and a returning module (506) configured to return the obtained scene-based video segments to the client. In some embodiments, the scene-based video segments are obtained by the above-described apparatus for video processing.

In some embodiments, the apparatus for video processing further includes: a sending module (508) configured to: before the first receiving module (502) receives the segmentation request sent by the client regarding the video, send the information about a recommended segmentation level for the video to the client such that the client displays the recommended segmentation level to a user via a display interface.

In some embodiments, the sending module (508) is configured to send to the client the information about the recommended segmentation level for the video and the information about a recommended segment time duration such that the client displays both information to the user via the display interface.

In some embodiments, when the segmentation request further includes the information about the to-be-attained segment time duration; the returning module (506) is configured to determine, among the obtained scene-based video segments, a scene-based video segment having a time duration matching the time duration indicated by the information about the to-be-attained segment time duration; and return the matching scene-based video segment to the client.

In some embodiments, when the segmentation request further includes the information about the target content; the returning module (506) is configured to determine, among the scene-based video segments, a scene-based video segment having the content information matching the information about the target content; and return the matching scene-based video segment to the client.

In some embodiments, the apparatus for video processing implements the corresponding method of video processing illustrated in the embodiments above, with similar benefits, the details of which are not repeated herein. Further, details of the implementation of functions of the modules in the apparatus for video processing that are substantially similar to the method embodiments described above are not repeated herein either.

Figure 7:
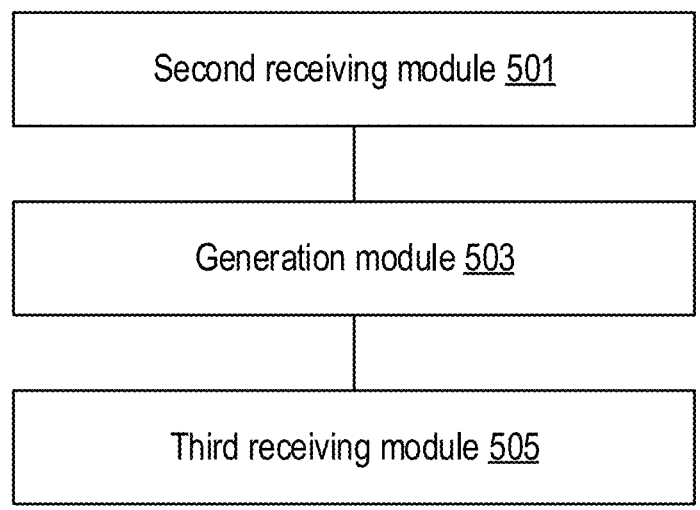
FIG. 7 is a block diagram illustrating an apparatus for video processing according to some embodiments of the disclosure.

FIG. 7 is a block diagram illustrating an apparatus for video processing according to some embodiments of the disclosure. In some embodiments and as shown in FIG. 7, the apparatus for video processing includes: a second receiving module (501) configured to receive, via an interactive interface, segmentation information input by a user, wherein the segmentation information includes the information about a video to be segmented, and the information about a to-be-attained segmentation level for the video; a generation module (503) configured to generate a segmentation request based on the segmentation information, and send the segmentation request to a server; and a third receiving module (505) configured to receive scene-based video segments of the video returned by the server based on the segmentation request, the scene-based video segments corresponding to the to-be-attained segmentation level.

In some embodiments, the scene-based video segments are obtained by the server by processing the video using the apparatus for video processing described above with reference to FIG. 5.

In some embodiments, when the segmentation information further includes the information about the to-be-attained segment time duration; the third receiving module (505) is configured to receive scene-based video segments of the video that correspond to the to-be-attained segmentation level and the to-be-attained segment time duration and are returned by the server based on the segmentation request.

In some embodiments, the second receiving module (501) is configured to receive recommendation information sent by the server, wherein the recommendation information includes the information about a recommended segmentation level and the information about a recommended segment time duration determined based on segmentation processing performed on the video; display, via the interactive interface, the information about the recommended segmentation level and the information about the recommended segment time duration; and receive the segmentation information input by the user based on the information about the recommended segmentation level and/or the information about the recommended segment time duration.

In some embodiments, when the segmentation information further includes the information about the required target content; the third receiving module (505) is configured to receive scene-based video segments of the video returned by the server based on the segmentation request, the scene-based video segments corresponding to the to-be-attained segmentation level and the information about the target content.

In some embodiments, the apparatus for video processing implements the corresponding method of video processing illustrated in the embodiments above, with similar benefits, the details of which are not repeated herein. Further, details of the implementation of functions of the modules in the apparatus for video processing that are substantially similar to the method embodiments described above are not repeated herein either FIG. 8 is a block diagram illustrating an electronic device according to some embodiments of the disclosure. Embodiments of the disclosure are not limited to electronic devices. In some embodiments, an electronic device includes an intelligent device such as an on-board device.

Figure 8:
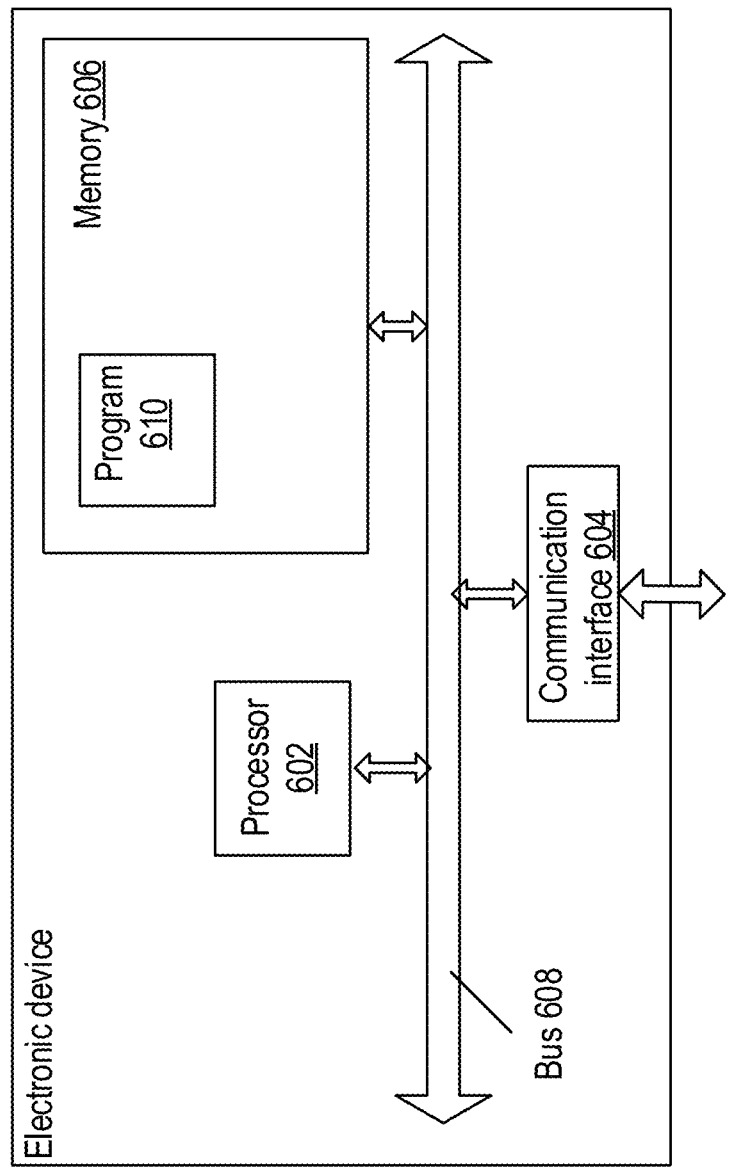
FIG. 8 is a block diagram of an electronic device according to some embodiments of the disclosure.

In some embodiments, and as shown in FIG. 8, the intelligent device includes a processor (602), a communication interface (604), a memory (606), and a communication bus (608).

In some embodiments, the processor (602), the communication interface (604), and the memory (606) communicate with one another via the communication bus (608).

The communication interface (604) is configured to communicate with other intelligent devices or a server.

The processor (602) is used to execute a program (610) to perform the steps in the above-described embodiments for video processing.

In some embodiments, the program (610) includes program code, which includes computer operation instructions.

In some embodiments, the processor (602) is a central processing unit (CPU) or an Application Specific Integrated Circuit (ASIC) or is configured to be one or a plurality of integrated circuits for implementing the embodiments of the disclosure. The intelligent device includes one or a plurality of processors, which can be processors of the same type, such as one or a plurality of CPUs, and can also be processors of different types, such as one or a plurality of CPUs and one or a plurality of ASICs.

In some embodiments, the memory (606) is configured to store the program (610). The memory (606) may include a high-speed RAM, a non-volatile memory such as at least one disk memory.

In one implementation, an electronic device is implemented in the form of a server.

In some embodiments, the program (610) is configured to, when executed by the processor (602), cause the electronic device to execute the following operations: acquiring a plurality of units of shot-based video segments from a video to be segmented; and segmenting, based on a plurality of pre-configured segmentation levels and the degrees of similarity associated with the units of shot-based video segments corresponding to each of the segmentation levels, the video into scene-based video segments of different granularities corresponding to the plurality of segmentation levels, respectively.

In some embodiments, the program (610) is further configured, when executed by the processor (602), cause the electronic device to: when segmenting, based on a plurality of pre-configured segmentation levels and the degrees of similarity associated with the units of shot-based video segments corresponding to each of the segmentation levels, the video into scene-based video segments of different granularities respectively corresponding to the plurality of segmentation levels, determine the plurality of units of shot-based video segments corresponding to each of the plurality of pre-configured segmentation levels and the degrees of similarity associated with the units of shot-based video segments; merge, at each of the segmentation levels and based on a temporal relationship among the plurality of units of shot-based video segments, units of shot-based video segments having the degrees of similarity meeting a pre-configured similarity threshold corresponding to each of the segmentation levels; and generate, based on a merging result, scene-based video segments corresponding to each of the segmentation levels.

In some embodiments, the program (610) is further configured, when executed by the processor (602), cause the electronic device to: when merging, at each of the segmentation levels and based on a temporal relationship among the plurality of units of shot-based video segments, units of shot-based video segments having the degrees of similarity meeting a pre-configured similarity threshold corresponding to each of the segmentation levels, at each of the segmentation levels and based on the temporal relationship among the plurality of units of corresponding shot-based video segments, acquire at least one shot-based video segment set of the number of segment intervals within a pre-configured number range and including segments having the degrees of similarity meeting the pre-configured similarity threshold corresponding to the current segmentation level; and respectively merge units of shot-based video segments in each of the at least one shot-based video segment set.

In one embodiment, the program 610 is further configured, when executed by the processor (602), cause the electronic device to: when acquiring at least one shot-based video segment set of the number of segment intervals within a pre-configured number range and including segments having the degrees of similarity meeting the pre-configured similarity threshold corresponding to the current segmentation level, determine, among a pre-configured number of units of shot-based video segments adjacent to a reference unit of shot-based video segments, whether a unit of shot-based video segments having the degree of similarity to the reference unit of shot-based video segments meeting the pre-configured similarity threshold corresponding to the current segmentation level is present; if so, designate the unit of shot-based video segments as a new reference unit of shot-based video segments, and return to continuing to execute the operation of determining, among a pre-configured number of units of shot-based video segments adjacent to a reference unit of shot-based video segments, whether a unit of shot-based video segments having the degree of similarity to the reference unit of shot-based video segments meeting the pre-configured similarity threshold corresponding to the current segmentation level is present, until a determination result indicates that a unit of shot-based video segments meeting the pre-configured similarity threshold is not present; and classify units of shot-based video segments between the plurality of reference units of shot-based video segments meeting the pre-configured similarity threshold into one shot-based video segment set.

In one embodiment, the program (610) is further configured, when executed by the processor (602), cause the electronic device to: when there is no units of shot-based video segments having a degree of similarity to the reference unit of shot-based video segments meeting the pre-configured similarity threshold corresponding to the current segmentation level, generate a shot-based video segment set based on the current reference unit of shot-based video segments.

In one embodiment, the program (610) is further configured, when executed by the processor (602), cause the electronic device to: when merging, at each of the segmentation levels and based on a temporal relationship among the plurality of units of shot-based video segments, units of shot-based video segments having the degrees of similarity meeting a pre-configured similarity threshold corresponding to each of the segmentation levels, at each of the segmentation levels and based on the temporal relationship among the plurality of units of shot-based video segments, merge units of shot-based video segments having the degrees of similarity meeting the pre-configured similarity threshold corresponding to the current segmentation level to acquire a plurality of scene-based video segments corresponding to the current segmentation level; calculate degrees of similarity associated with the plurality of scene-based video segments, and designate the plurality of scene-based video segments corresponding to the current segmentation level as a plurality of units of shot-based video segments at the subsequent segmentation level; and merge the units of shot-based video segments at the subsequent segmentation level based on the calculated degrees of similarity and the plurality of designated units of shot-based video segments.

In one embodiment, the program (610) is further configured, when executed by the processor (602), cause the electronic device to acquire the degrees of similarity associated with the units of shot-based video segments by: acquiring a multi-modal feature of each of the plurality of units of shot-based video segments; and acquiring the degrees of similarity associated with the units of shot-based video segments based on the multi-modal feature of each of the plurality of units of shot-based video segments.

In one embodiment, the program (610) is further configured, when executed by the processor (602), cause the electronic device to, when acquiring a multi-modal feature of each of the plurality of units of shot-based video segments, acquire a visual feature, a speech feature, and a textual feature of each of the plurality of units of shot-based video segments; and combine the visual feature, the speech feature, and the textual feature to acquire the multi-modal feature of each of the plurality of units of shot-based video segments.

In one embodiment, the program (610) is further configured, when executed by the processor (602), cause the electronic device to: acquire a scene purity degree corresponding to each of the segmentation levels; determine, among the plurality of scene purity degrees, a level having a scene purity degree closest to a pre-configured scene purity degree as a recommended segmentation level; and determine the longest duration of scene-based video segments at the recommended segmentation level as a recommended segment duration.

In some embodiments, the electronic device is implemented in the form of a server. In some embodiments, the program (610) is configured, when executed by the processor (602), cause the electronic device to execute the following operations: receiving a segmentation request sent by a client for a video to be segmented, wherein the segmentation request includes the information about a to-be-attained segmentation level; performing a scene boundary detection on the video at a segmentation level indicated by the information about the to-be-attained segmentation level to obtain scene-based video segments corresponding to the segmentation level; and returning the obtained scene-based video segments to the client. In some embodiments, the scene-based video segments are obtained by using the methods of video processing described above.

In some embodiments, the program (610) is configured, when executed by the processor (602), cause the electronic device to, before receiving the segmentation request sent by the client to segment the video, send the information about a recommended segmentation level for the video to the client such that the client displays the recommended segmentation level to a user via a display interface.

In some embodiments, the program (610) is configured, when executed by the processor (602), cause the electronic device to, when sending the information about a recommended segmentation level for the video to the client such that the client displays the recommended segmentation level to a user via a display interface, send to the client the information about the recommended segmentation level for the video and the information about a recommended segment time duration such that the client displays the recommended segment time duration to the user via the display interface.

In some embodiments, the program (610) is configured, when executed by the processor (602), cause the electronic device to, when returning the obtained scene-based video segments to the client, determine, among the obtained scene-based video segments, a scene-based video segment having a duration matching a duration indicated by the information about the to-be-attained segment time duration; and return the matching scene-based video segment to the client.

In some embodiments, the program (610) is configured, when executed by the processor (602), cause the electronic device to, when returning the obtained scene-based video segments to the client, acquire the content information of the scene-based video segments corresponding to the segmentation level; determine, among the scene-based video segments, a scene-based video segment having content information matching the information about the target content; and return the matching scene-based video segment to the client.

In some embodiments, the electronic device is implemented in the form of a client device. In some embodiments, the program (610) is configured, when executed by the processor (602), cause the electronic device to, receiving, via an interactive interface, segmentation information input by a user, wherein the segmentation information includes the information about a video to be segmented, and the information about a to-be-attained segmentation level for the video; generating a segmentation request based on the segmentation information for sending to a server; and receiving scene-based video segments of the video returned by the server based on the segmentation request, the scene-based video segments corresponding to the required segmentation level.

In some embodiments, the scene-based video segments are obtained by the server by processing the video using the methods of video processing described above.

In some embodiments, the program (610) is configured, when executed by the processor (602), cause the electronic device to, when receiving scene-based video segments of the video returned by the server based on the segmentation request, receive scene-based video segments of the video returned by the server based on the segmentation request, the scene-based video segments corresponding to the required segmentation level and the to-be-attained segment time duration.

In some embodiments, the program (610) is configured, when executed by the processor (602), cause the electronic device to, when receiving, via an interactive interface, segmentation information input by a user, receive recommendation information sent by the server, wherein the recommendation information includes the information about a recommended segmentation level and the information about a recommended segment time duration determined based on segmentation processing performed on the video; displaying, via the interactive interface, the information about the recommended segmentation level and the information about the recommended segment time duration; and receiving the segmentation information input by the user based on the information about the recommended segmentation level and/or the information about the recommended segment time duration.

In some embodiments, the program (610) is configured, when executed by the processor (602), cause the electronic device to, when receiving scene-based video segments of the video returned by the server based on the segmentation request, receive scene-based video segments of the video returned by the server based on the segmentation request, the scene-based video segments corresponding to the required segmentation level and the information about the target content.

Details of the steps in the program (610) that are substantially similar to those above embodiments for video processing are not repeated herein. For the purpose of simplicity, details of the processes of the device and modules that are substantially similar to the corresponding processes of the above-described embodiments are not repeated herein.

In some embodiments, the shot-based video segment units are configured as the basic processing unit. On one or more segmentation levels (e.g., representing segment granularities), the units of shot-based video segments are merged based on the degrees of similarity associated with the units of shot-based video segments to form a plurality of scene-based video segments matching the granularity of each of the segmentation levels. Therefore, scene segmentation of different granularities meeting different requirements is performed, and no manual operation is needed, thereby greatly improving scene segmentation efficiency and reducing labor costs.

It should be noted that depending on needs for implementation, each component/step described in the embodiments of the disclosure can be split into additional components/steps, or two or more components/steps or parts of the components/steps can be combined into new components/steps to achieve the objective of the embodiments of the disclosure.

The above method based on the invention may be implemented in hardware or firmware, or implemented as software or computer code that can be stored in a recording medium (such as a CD ROM, a RAM, a floppy disk, a hard disk, or an optical disc), or implemented as computer code downloaded over a network, originally stored in a remote recording medium or a non-transitory machine readable medium, and to be stored in a local recording medium. Thus, the method described herein can be processed by software stored in a recording medium used in a general-purpose computer, a special-purpose processor, or programmable or special-purpose hardware such as an ASIC or an FPGA. It may be appreciated that a computer, a processor, a microprocessor controller, or programmable hardware includes a storage component (e.g., RAM, ROM, Flash, etc.) that can store or receive software or computer code that implements the method of video processing described herein when accessed and executed by a computer, a processor, or hardware. In addition, when a general-purpose computer accesses code for implementing the method of video processing illustrated herein, the execution of the code converts the general-purpose computer into a dedicated computer for performing the method of video processing illustrated herein.

Persons of ordinary skill in the art may appreciate that, in combination with the examples described in the embodiments disclosed in this specification, units and method steps can be implemented by electronic hardware, computer software, or a combination thereof. Whether the functions are executed by hardware or software depends on particular applications and design constraint conditions of the technical solutions. Persons skilled in the art may use different methods to implement the described functions for each particular application, but it should not be considered that the implementation goes beyond the scope of the embodiments of the disclosure.

The above implementations are merely intended to illustrate the embodiments of the disclosure, rather than limiting the embodiments of the disclosure. Persons of ordinary skill in the art can also make various changes and modifications without departing from the spirit and scope of the embodiments of the disclosure. Therefore, all equivalent technical solutions also fall within the scope of the embodiments of the disclosure.

What is claimed is:

1. A method comprising:
   identifying, by a processor, video segments from a video, each video segment associated with a shot of the video;
   computing, by the processor, degrees of similarities for each of the video segments, a given degree of similarity for a given video segment computed between the given video segment and an adjacent video segment, the degrees of similarities associated with corresponding segmentation levels; and
   segmenting, by the processor, the video segments based on the degrees of similarities and the segmentation levels to generate sets of scene-based video segments, each set of scene-based video segment associated with a corresponding segmentation level and a plurality of the video segments.

2. The method of claim 1, the segmenting the video segments comprising:
merging, for each segmentation level, video segments having degrees of similarity meeting a pre-configured similarity threshold, the pre-configured similarity threshold corresponding to each of the segmentation levels; and
generating, based on the merging, the sets of scene-based video segments corresponding to each of the segmentation levels.

3. The method of claim 2, the merging the video segments further comprising:
acquiring, for each segmentation level, a set of video segments based on temporal relationships among the video segments, the set of video segments comprising video segments corresponding to a number of segment intervals within a pre-configured number range and having degrees of similarity meeting the pre-configured similarity threshold corresponding to a respective segmentation level.

4. The method of claim 3, the merging the video segments comprising:
merging, at each of the segmentation levels and based on the temporal relationships among the video segments, video segments having degrees of similarity meeting the pre-configured similarity threshold corresponding to a respective segmentation level to obtain scene-based video segments corresponding to the respective segmentation level;
computing degrees of similarity associated with the scene-based video segments;
designating the scene-based video segments corresponding to the respective segmentation level as video segments at a subsequent segmentation level; and
merging video segments at the subsequent segmentation level based on the computed degrees of similarity obtained and the designated video segments.

5. The method of claim 1, the computing degrees of similarity comprising:
acquiring multi-modal features for each of the video segments; and
acquiring the degrees of similarity associated with the video segments based on the multi-modal feature of each of the video segments.

6. The method of claim 5, the acquiring multi-modal features for each of the video segments comprising:
acquiring at least one of: a visual feature, a speech feature, and a textual feature for each of the video segments; and
combining the at least one of the visual feature, the speech feature, and the textual feature to obtain the multi-modal feature of each of the video segments.

7. The method of claim 1, further comprising:
acquiring respective scene purity degrees corresponding to the segmentation levels;
determining, among the scene purity degrees, a segmentation level having a scene purity degree closest to a pre-configured scene purity degree as a recommended segmentation level; and
determining a longest time duration of a set of scene-based video segments at the recommended segmentation level as a recommended segment time duration.

8. An apparatus comprising:
a processor; and
a storage medium for tangibly storing thereon program logic for execution by the processor, the stored program logic comprising:
logic, executed by the processor, for identifying video segments from a video, each video segment associated with a shot of the video,
logic, executed by the processor, for computing degrees of similarities for each of the video segments, a given degree of similarity for a given video segment computed between the given video segment and an adjacent video segment, the degrees of similarities associated with corresponding segmentation levels, and
logic, executed by the processor, for segmenting the video segments based on the degrees of similarities and the segmentation levels to generate sets of scene-based video segments, each set of scene-based video segment associated with a corresponding segmentation level and a plurality of the video segments.

9. The apparatus of claim 8, the logic for segmenting the video segments comprising:
logic, executed by the processor, for merging, for each segmentation level, video segments having degrees of similarity meeting a pre-configured similarity threshold, the pre-configured similarity threshold corresponding to each of the segmentation levels; and
logic, executed by the processor, for generating, based on the merging, the sets of scene-based video segments corresponding to each of the segmentation levels.

10. The apparatus of claim 9, the logic for merging the video segments further comprising:
logic, executed by the processor, for acquiring, for each segmentation level, a set of video segments based on temporal relationships among the video segments, the set of video segments comprising video segments corresponding to a number of segment intervals within a pre-configured number range and having degrees of similarity meeting the pre-configured similarity threshold corresponding to a respective segmentation level.

11. The apparatus of claim 10, the logic for merging the video segments comprising:
logic, executed by the processor, for acquiring, for merging, at each of the segmentation levels and based on the temporal relationships among the video segments, video segments having degrees of similarity meeting the pre-configured similarity threshold corresponding to a respective segmentation level to obtain scene-based video segments corresponding to the respective segmentation level,
logic, executed by the processor, for acquiring, for computing degrees of similarity associated with the scene-based video segments,
logic, executed by the processor, for acquiring, for designating the scene-based video segments corresponding to the respective segmentation level as video segments at a subsequent segmentation level, and
logic, executed by the processor, for acquiring, for merging video segments at the subsequent segmentation level based on the computed degrees of similarity obtained and the designated video segments.

12. The apparatus of claim 8, the logic for computing degrees of similarity comprising:
logic, executed by the processor, for acquiring multi-modal features for each of the video segments, and logic, executed by the processor, for acquiring the degrees of similarity associated with the video segments based on the multi-modal feature of each of the video segments.

13. The apparatus of claim 12, the logic for acquiring multi-modal features for each of the video segments comprising:
   logic, executed by the processor, for acquiring at least one of: a visual feature, a speech feature, and a textual feature for each of the video segments, and
   logic, executed by the processor, for combining the at least one of the visual feature, the speech feature, and the textual feature to obtain the multi-modal feature of each of the video segments.

14. A non-transitory computer-readable storage medium for tangibly storing computer program instructions capable of being executed by a computer processor, the computer program instructions defining steps of:
   identifying, by a processor, video segments from a video, each video segment associated with a shot of the video;
   computing, by the processor, degrees of similarities for each of the video segments, a given degree of similarity for a given video segment computed between the given video segment and an adjacent video segment, the degrees of similarities associated with corresponding segmentation levels; and
   segmenting, by the processor, the video segments based on the degrees of similarities and the segmentation levels to generate sets of scene-based video segments, each set of scene-based video segment associated with a corresponding segmentation level and a plurality of the video segments.

15. The computer-readable storage medium of claim 14, the segmenting the video segments comprising:
   merging, for each segmentation level, video segments having degrees of similarity meeting a pre-configured similarity threshold, the pre-configured similarity threshold corresponding to each of the segmentation levels; and
   generating, based on the merging, the sets of scene-based video segments corresponding to each of the segmentation levels.

16. The computer-readable storage medium of claim 15, the merging the video segments comprising:
   acquiring, for each segmentation level, a set of video segments based on temporal relationships among the video segments, the set of video segments comprising video segments corresponding to a number of segment intervals within a pre-configured number range and having degrees of similarity meeting the pre-configured similarity threshold corresponding to a respective segmentation level.

17. The computer-readable storage medium of claim 16, the merging the video segments comprising:
   merging, at each of the segmentation levels and based on the temporal relationships among the video segments, video segments having degrees of similarity meeting the pre-configured similarity threshold corresponding to a respective segmentation level to obtain scene-based video segments corresponding to the respective segmentation level;
   computing degrees of similarity associated with the scene-based video segments;
   designating the scene-based video segments corresponding to the respective segmentation level as video segments at a subsequent segmentation level; and
   merging video segments at the subsequent segmentation level based on the computed degrees of similarity obtained and the designated video segments.

18. The computer-readable storage medium of claim 14, the computing degrees of similarity comprising:
   acquiring multi-modal features for each of the video segments; and
   acquiring the degrees of similarity associated with the video segments based on the multi-modal feature of each of the video segments.

19. The computer-readable storage medium of claim 18, the acquiring multi-modal features for each of the video segments comprising:
   acquiring at least one of: a visual feature, a speech feature, and a textual feature for each of the video segments; and
   combining the at least one of the visual feature, the speech feature, and the textual feature to obtain the multi-modal feature of each of the video segments.

20. The computer-readable storage medium of claim 14, the computer program instructions defining the steps of:
   acquiring respective scene purity degrees corresponding to the segmentation levels;
   determining, among the scene purity degrees, a segmentation level having a scene purity degree closest to a pre-configured scene purity degree as a recommended segmentation level; and
   determining a longest time duration of a set of scene-based video segments at the recommended segmentation level as a recommended segment time duration.

* * * * *